US012674679B1

(12) United States Patent
Carpenter

(10) Patent No.: US 12,674,679 B1
(45) Date of Patent: Jul. 7, 2026

(54) SYSTEM, MEDIA, AND METHOD FOR ENHANCED NAVIGATION

(71) Applicant: Interstate Data USA, Inc., Ashland, KY (US)

(72) Inventor: Randall Ray Carpenter, Ashland, KY (US)

(73) Assignee: Interstate Data USA, Inc., Ashland, KY (US)

( * ) Notice: Subject to any disclaimer, the term of this patent is extended or adjusted under 35 U.S.C. 154(b) by 27 days.

(21) Appl. No.: 18/976,894

(22) Filed: Dec. 11, 2024

Related U.S. Application Data

(63) Continuation-in-part of application No. 16/942,073, filed on Jul. 29, 2020, now Pat. No. 12,181,302.

(51) Int. Cl.
| | |
|---|---|
| *G01C 21/00* | (2006.01) |
| *G01C 21/34* | (2006.01) |
| *G01C 21/36* | (2006.01) |

(52) U.S. Cl.
CPC ....... *G01C 21/3679* (2013.01); *G01C 21/343* (2013.01)

(58) Field of Classification Search
CPC ............ G01C 21/3682; G01C 21/3476; G06F 16/245; G06F 16/248; G06F 16/29; H04W 4/024
USPC ........................................................ 701/411
See application file for complete search history.

(56) References Cited

U.S. PATENT DOCUMENTS

| | | | |
|---|---|---|---|
| 7,873,471 | B2 | 1/2011 | Gieseke |
| 8,731,814 | B2 | 5/2014 | Schunder |

| | | | |
|---|---|---|---|
| 9,146,118 | B2 | 9/2015 | Liu et al. |
| 10,371,536 | B2 | 8/2019 | König et al. |
| 2006/0089788 | A1 | 4/2006 | Laverty |
| 2007/0010942 | A1 | 1/2007 | Bill |
| 2011/0218831 | A1 | 9/2011 | Bolling |
| 2013/0185355 | A1 | 7/2013 | Tseng |
| 2015/0204688 | A1 | 7/2015 | Gearhart |
| 2016/0069697 | A1* | 3/2016 | Oel .................... G01C 21/3605 701/426 |

(Continued)

FOREIGN PATENT DOCUMENTS

| | | |
|---|---|---|
| DE | 102014204758 A1 | 9/2014 |
| WO | 2010111833 A1 | 10/2010 |
| WO | 2020050842 A1 | 3/2020 |

*Primary Examiner* — Tiffany P Young
(74) *Attorney, Agent, or Firm* — Dinsmore & Shohl LLP

(57) ABSTRACT

Systems, methods, and media for enhanced navigation are provided. A method may include determining a current location based upon received location data; determining a travel route from the current location to a specified destination location; receiving a query, from a user interface, requesting a plurality of requested destination types along the travel route; determining a result set comprising a plurality of locations corresponding to the plurality of requested destination types along the travel route; determining at least one of discount information or membership benefits information associated with at least one location of the plurality of locations in the result set; and displaying, via the user interface and in response to the received query, a plurality of result subsets and at least one of the discount information or the membership benefits information; and updating the current location, the result set, the plurality of result subsets.

20 Claims, 36 Drawing Sheets

(56)             References Cited

U.S. PATENT DOCUMENTS

| | | |
|---|---|---|
| 2016/0364224 A1 | 12/2016 | Tuukkanen |
| 2017/0067750 A1 | 3/2017 | Day |

\* cited by examiner

Figure 13A:
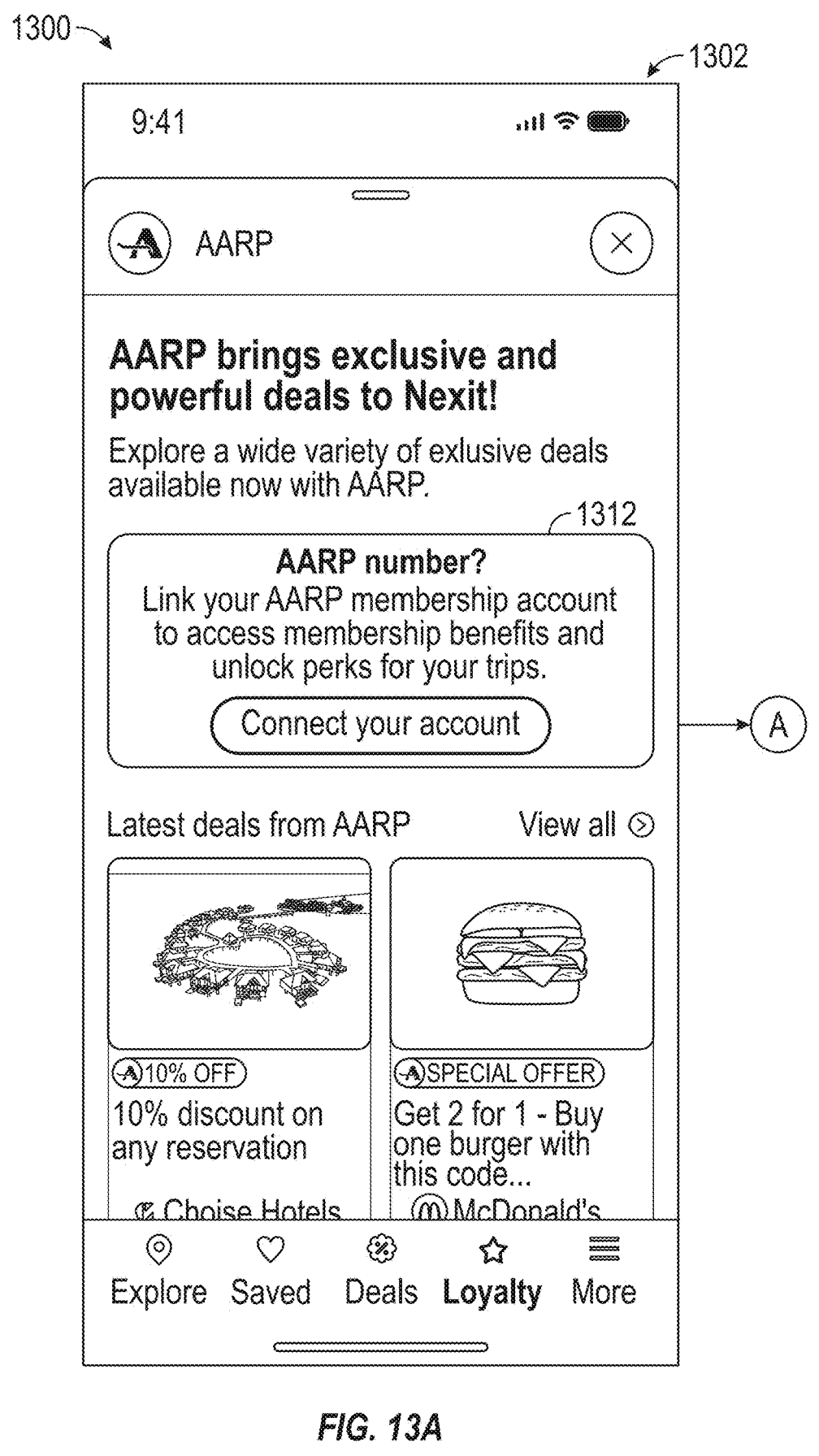

A  AARP                                    ✕

AARP brings exclusive and powerful deals to Nexit!

Explore a wide variety of exlusive deals available now with AARP.

1312

AARP number?
Link your AARP membership account to access membership benefits and unlock perks for your trips.

( Connect your account )

A

Latest deals from AARP          View all ⊙

(A)10% OFF                    (A)SPECIAL OFFER

10% discount on any reservation      Get 2 for 1 - Buy one burger with this code...

⸰ Choise Hotels          (m)McDonald's

⊙ Explore    ♡ Saved    🏷 Deals    ☆ Loyalty    ☰ More

Figure 13B:
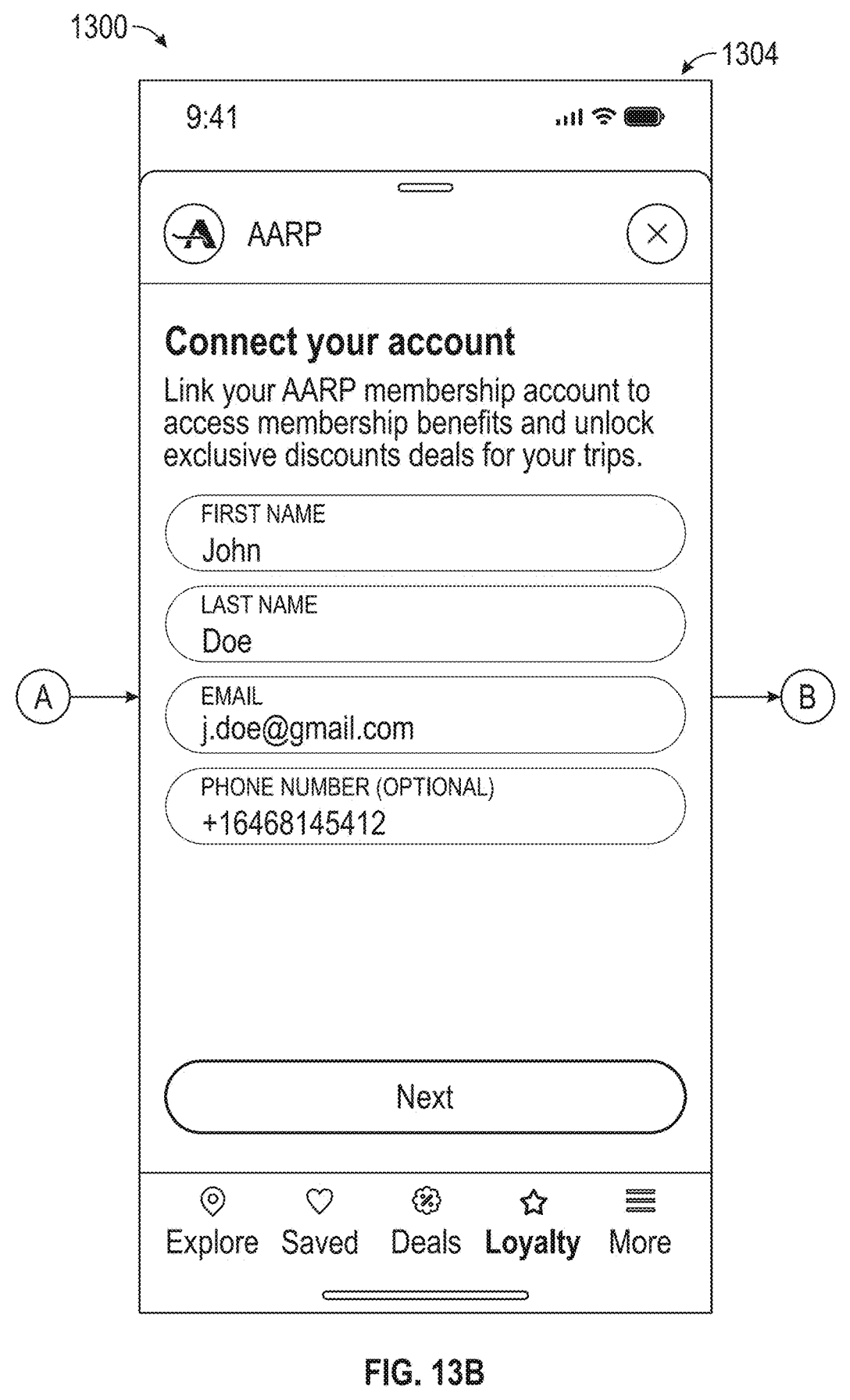

AARP         ✕

Connect your account

Link your AARP membership account to access membership benefits and unlock exclusive discounts deals for your trips.

FIRST NAME
John

LAST NAME
Doe

A →

EMAIL
j.doe@gmail.com

→ B

PHONE NUMBER (OPTIONAL)
+16468145412

Next

Explore    Saved    Deals    Loyalty    More

Figure 13C:
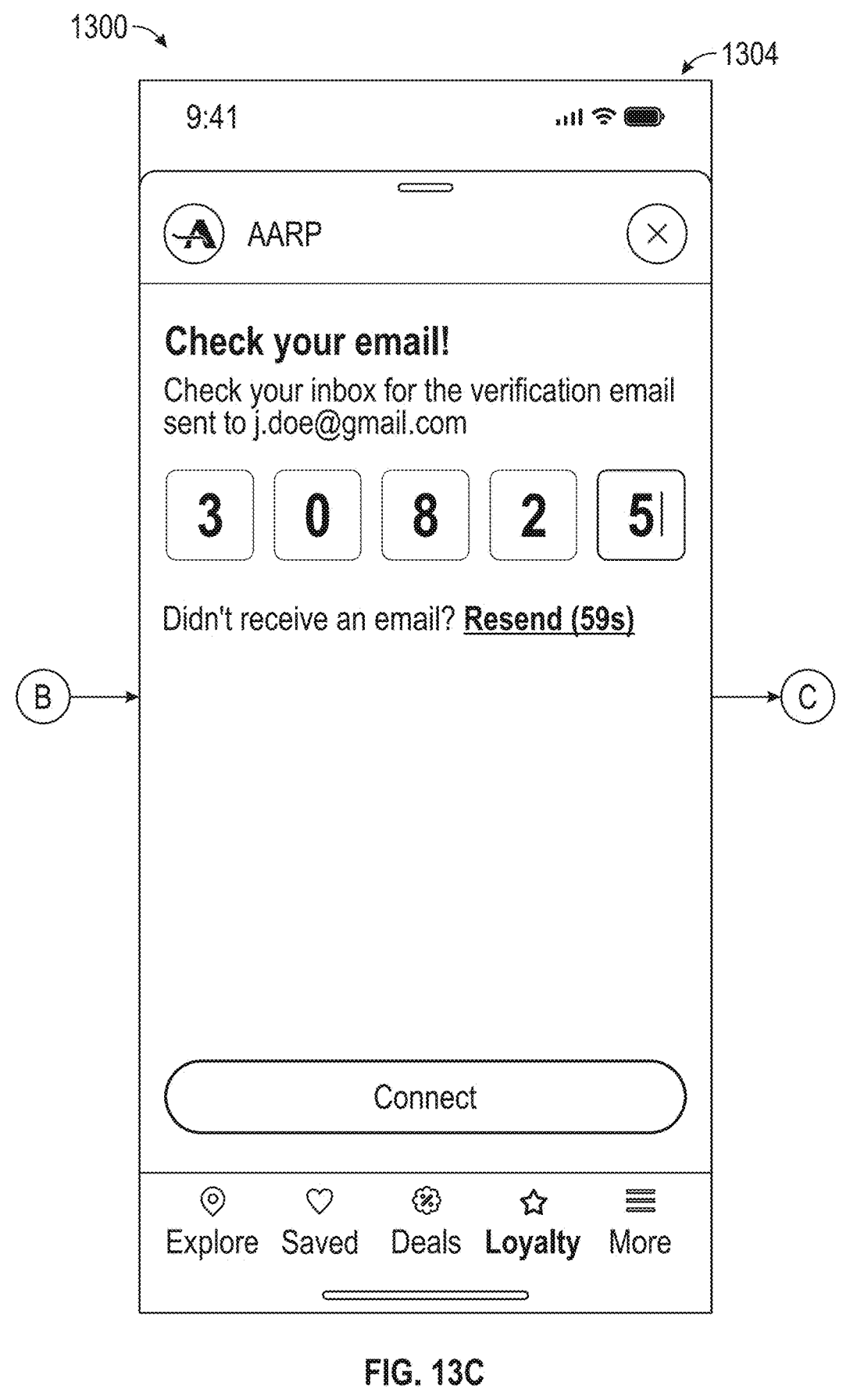

AARP ✕

Check your email!

Check your inbox for the verification email
sent to j.doe@gmail.com

| 3 | 0 | 8 | 2 | 5| |

Didn't receive an email? Resend (59s)

B →

→ C

Connect

⊙ Explore    ♡ Saved    ⊛ Deals    ☆ Loyalty    ≡ More

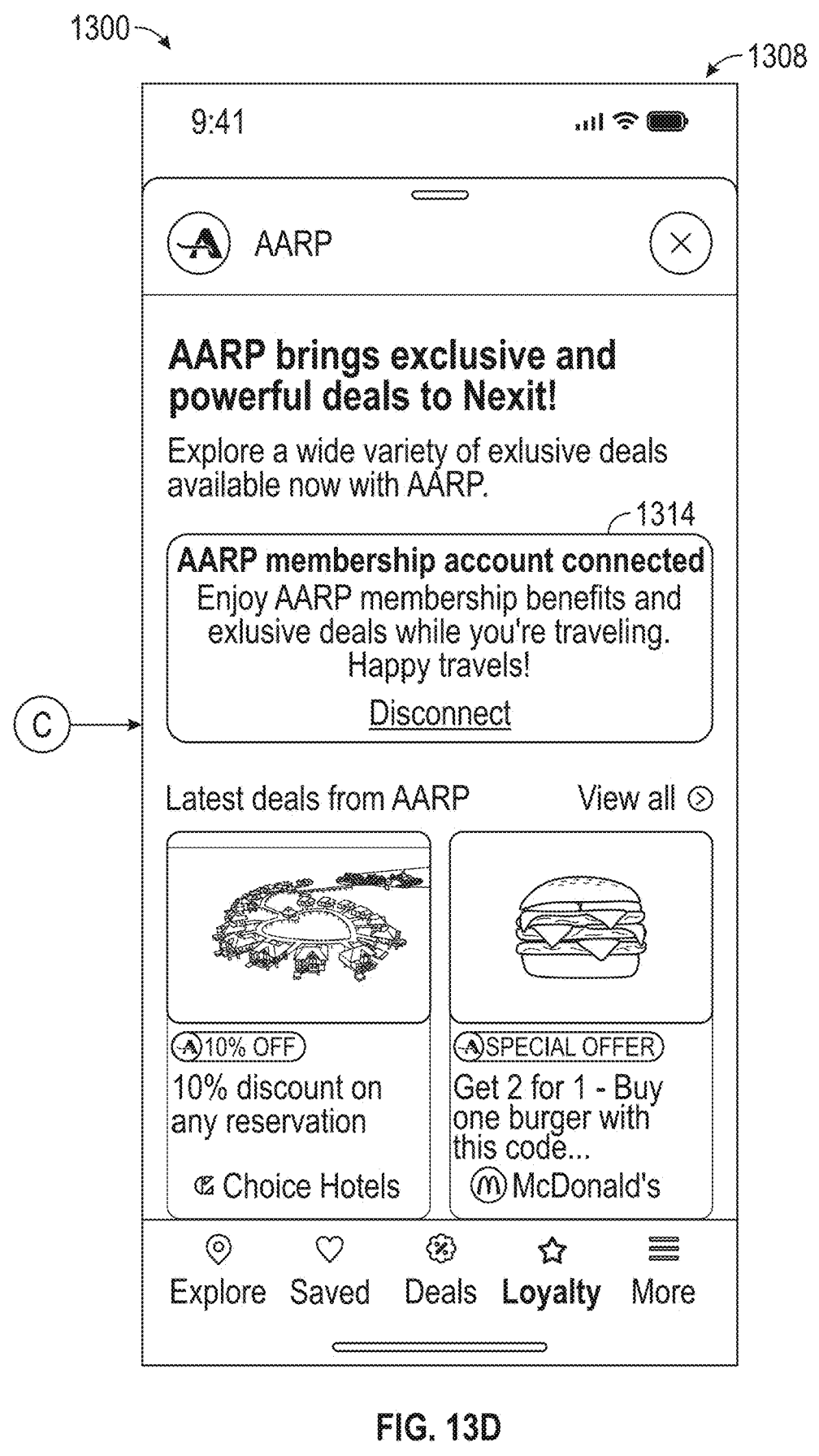

A AARP                    ✕

AARP brings exclusive and powerful deals to Nexit!

Explore a wide variety of exlusive deals available now with AARP.

1314

AARP membership account connected
Enjoy AARP membership benefits and exlusive deals while you're traveling. Happy travels!

Disconnect

C

Latest deals from AARP            View all ⊙

(A)10% OFF                    (A)SPECIAL OFFER

10% discount on any reservation       Get 2 for 1 - Buy one burger with this code...

⊄ Choice Hotels               (m)McDonald's

⊙            ♡            ⊛            ☆            ≡
Explore      Saved        Deals      Loyalty      More

FIG. 13D

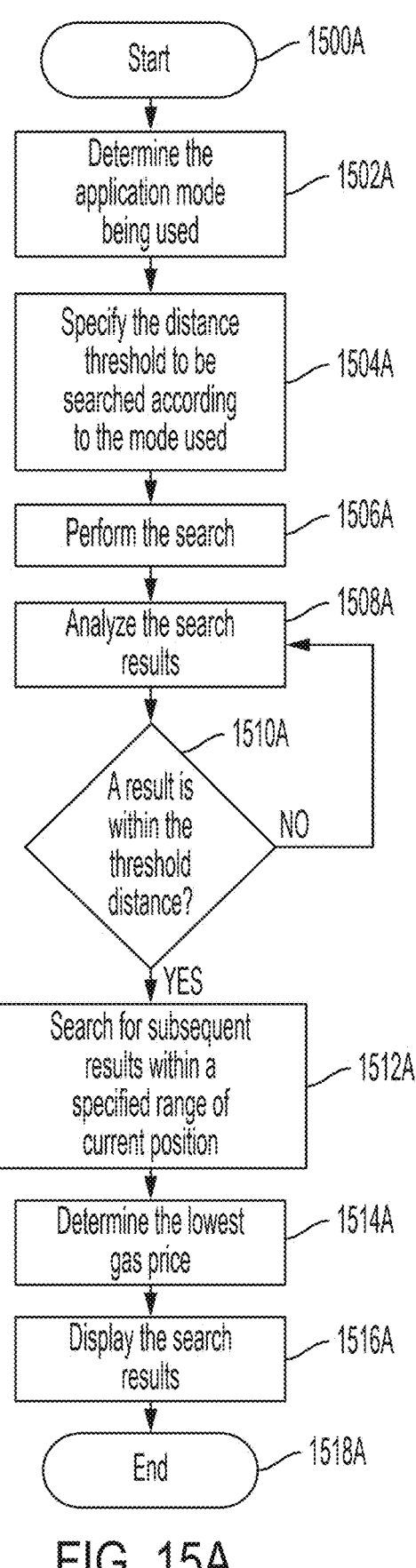

Start — 1500A

Determine the application mode being used — 1502A

Specify the distance threshold to be searched according to the mode used — 1504A Perform the search — 1506A Analyze the search results — 1508A

1510A

A result is within the threshold distance?            NO

YES

Search for subsequent results within a specified range of current position — 1512A Determine the lowest gas price — 1514A Display the search results — 1516A End — 1518A

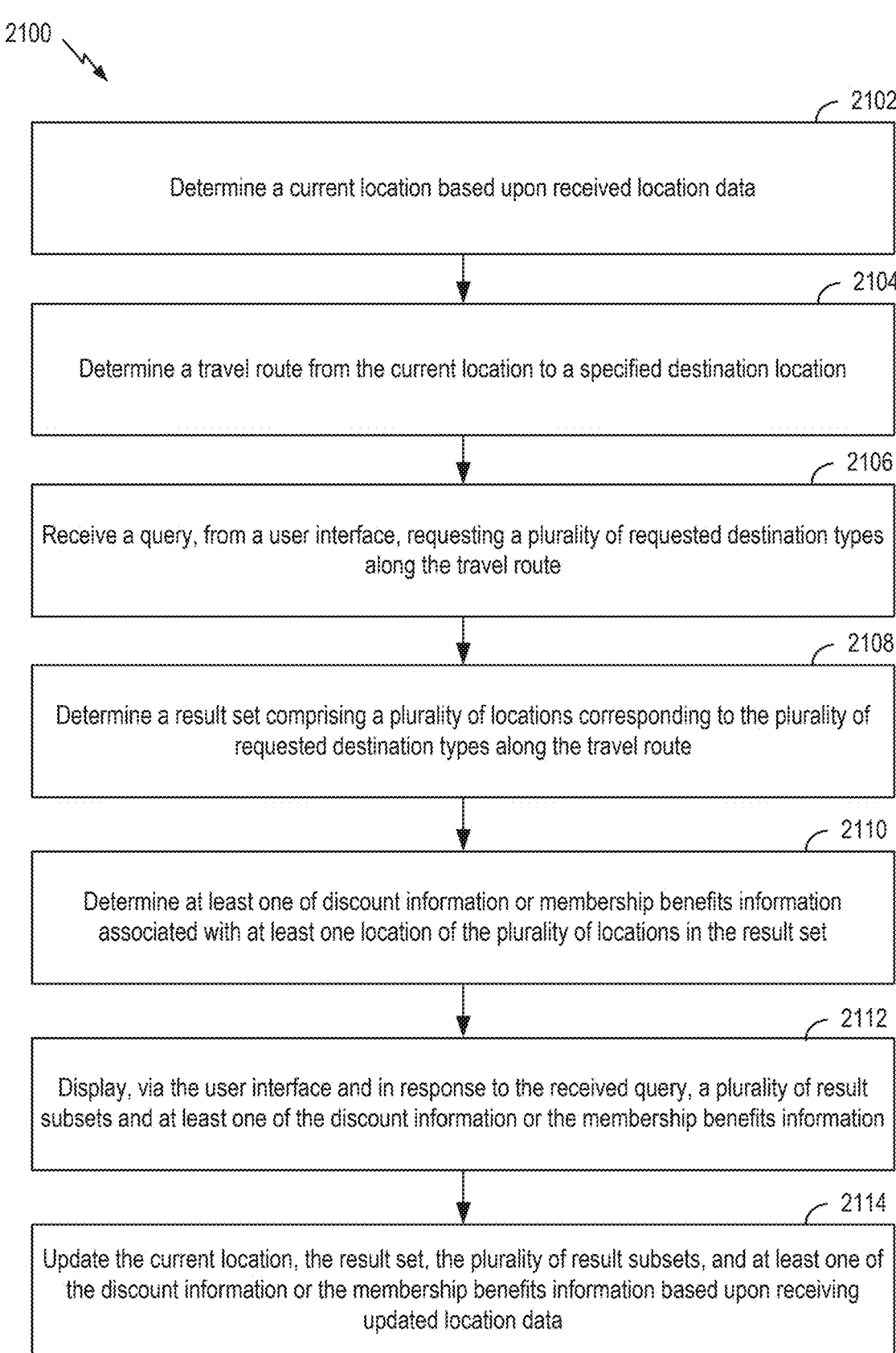

2102

Determine a current location based upon received location data

2104

Determine a travel route from the current location to a specified destination location

2106

Receive a query, from a user interface, requesting a plurality of requested destination types along the travel route

2108

Determine a result set comprising a plurality of locations corresponding to the plurality of requested destination types along the travel route

2110

Determine at least one of discount information or membership benefits information associated with at least one location of the plurality of locations in the result set

2112

Display, via the user interface and in response to the received query, a plurality of result subsets and at least one of the discount information or the membership benefits information

2114

Update the current location, the result set, the plurality of result subsets, and at least one of the discount information or the membership benefits information based upon receiving updated location data

*FIG. 21*

SYSTEM, MEDIA, AND METHOD FOR ENHANCED NAVIGATION

CROSS-REFERENCE TO RELATED APPLICATION

This Application is a continuation-in-part application under 35 U.S.C. § 120 of U.S. patent application Ser. No. 16/942,073, filed on Jul. 29, 2020, the entire contents of which are hereby incorporated by reference.

TECHNICAL FIELD

The present application generally relates to navigational systems, such as navigational systems used by vehicle operators and passengers alike.

BACKGROUND

Drivers and passengers often want to make intermediate stops along their travel route, such as on a highway or interstate. These stops may be planned or arise spontaneously, and may relate to a variety of points of interest such as fuel, meals, lodging, shopping, and the like. Traditionally, road signs, maps, and atlases were utilized to locate where to make such points of interest. The proliferation of navigational systems now allows vehicle operators and passengers to more conveniently search for such points of interest. However, current navigational hardware and software still have important shortcomings.

Accordingly, a need exists for systems that provide enhanced navigation for en route stops, along with media and methods of use of such systems.

SUMMARY

In an aspect, a method may comprise determining a current location based upon received location data; determining a travel route from the current location to a specified destination location; receiving a query, from a user interface, requesting a plurality of requested destination types along the travel route, wherein: each of the plurality of requested destination types belongs to at least one of a plurality of destination categories; and each of the destination categories comprises two or more of the plurality of requested destination types; determining a result set comprising a plurality of locations corresponding to the plurality of requested destination types along the travel route; determining at least one of discount information or membership benefits information associated with at least one location of the plurality of locations in the result set; displaying, via the user interface and in response to the received query, a plurality of result subsets and at least one of the discount information or the membership benefits information, wherein: each result subset of the plurality of result subsets comprises a subset of the plurality of requested destination types in the result set based upon a threshold distance, the threshold distance associated with each result subset is a distance between: each of the requested destination types within the respective result subset; or a common location and each of the requested destination types within the respective result subset, and at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and updating the current location, the result set, the plurality of result subsets, and at least one of the discount information or the membership benefits information based upon receiving updated location data.

In another aspect, a system may comprise memory and a processor coupled to the memory, wherein the processor is configured to cause the system to determine a current location based upon received location data; determine a travel route from the current location to a specified destination location; receive a query, from a user interface, requesting a plurality of requested destination types along the travel route, wherein: each of the plurality of requested destination types belongs to at least one of a plurality of destination categories; and each of the destination categories comprises two or more of the plurality of requested destination types; determine a result set comprising a plurality of locations corresponding to the plurality of requested destination types along the travel route; determine at least one of discount information or membership benefits information associated with at least one location of the plurality of locations in the result set; display, via the user interface and in response to the received query, a plurality of result subsets and at least one of the discount information or the membership benefits information, wherein: each result subset of the plurality of result subsets comprises a subset of the plurality of requested destination types in the result set based upon a threshold distance, the threshold distance associated with each result subset is a distance between: each of the requested destination types within the respective result subset; or a common location and each of the requested destination types within the respective result subset, and at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and update the current location, the result set, the plurality of result subsets, and at least one of the discount information or the membership benefits information based upon receiving updated location data.

In yet another aspect, a non-transitory computer readable medium embodies computer-executable instructions that, when executed by a processor, cause the processor to execute operations comprising: determining a current location based upon received location data; determining a travel route from the current location to a specified destination location; receiving a query, from a user interface, requesting a plurality of requested destination types along the travel route, wherein: each of the plurality of requested destination types belongs to at least one of a plurality of destination categories; and each of the destination categories comprises two or more of the plurality of requested destination types; determining a result set comprising a plurality of locations corresponding to the plurality of requested destination types along the travel route; determining at least one of discount information or membership benefits information associated with at least one location of the plurality of locations in the result set; displaying, via the user interface and in response to the received query, a plurality of result subsets and at least one of the discount information or the membership benefits information, wherein: each result subset of the plurality of result subsets comprises a subset of the plurality of requested destination types in the result set based upon a threshold distance, the threshold distance associated with each result subset is a distance between: each of the requested destination types within the respective result subset; or a common location and each of the requested destination types within the respective result subset, and at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and updating the current location, the result set, the plurality of result subsets, and at least one of the discount information or the membership benefits information based upon receiving updated location data.

In yet another aspect, a method may comprise determining a current location based upon received location data. The method may also comprise receiving query data requesting a plurality of destination types. The method may further comprise determining a result set comprising a plurality of locations corresponding to destination types within a first threshold distance of the current location. The method may additionally comprise returning a result subset comprising a plurality of the result set destination types based upon a second threshold distance that differs from the first threshold distance, wherein the second threshold distance is a distance between each of the requested destination types within the result subset or a common location and each of the requested destination types within the result subset. The method updating the current location, the result set, and the result subset based upon receiving updated location data.

In yet another aspect, a system may comprise memory and a processor coupled to the memory, wherein the processor is configured to cause the system to determine a current location based upon received location data. The processor may be further configured to receive query data requesting a plurality of destination types. The processor may also be configured to determine a result set comprising a plurality of locations corresponding to destination types within a first threshold distance of the current location. The processor may be additionally configured to return a result subset comprising a plurality of the result set destination types based upon a second threshold distance that differs from the first threshold distance, wherein the second threshold distance is a distance between each of the requested destination types within the result subset or a common location and each of the requested destination types within the result subset. The processor also may be configured to update the current location, the result set, and the result subset based upon receiving updated location data.

In yet another aspect, a non-transitory computer readable medium embodies computer-executable instructions that, when executed by a processor, cause the processor to determine a current location based upon received location data. The processor may also receive query data requesting a plurality of destination types. The processor may further determine a result set comprising a plurality of locations corresponding to destination types within a first threshold distance of the current location. The processor may also return a result subset comprising a plurality of the result set destination types based upon a second threshold distance that differs from the first threshold distance, wherein the second threshold distance is a distance between each of the requested destination types within the result subset or a common location and each of the requested destination types within the result subset. The processor may also update the current location, the result set, and the result subset based upon receiving updated location data.

These and additional features provided by the embodiments described herein will be more fully understood in view of the following detailed description, in conjunction with the drawings.

BRIEF DESCRIPTION OF THE DRAWINGS

The aspects set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6C schematically illustrates another exemplary interface displaying results from a query with discount information, according to one or more aspects shown and described herein;

FIG. 13A illustrates a first step of an exemplary workflow for connecting a user's membership account, according to one or more aspects shown and described herein;

FIG. 13B illustrates a second step of the exemplary workflow for connecting a user's membership account, according to one or more aspects shown and described herein;

FIG. 13C illustrates a third step of the exemplary workflow for connecting a user's membership account, according to one or more aspects shown and described herein;

FIG. 13D illustrates a fourth step of the exemplary workflow for connecting a user's membership account, according to one or more aspects shown and described herein;

FIG. 15A is a flow chart depicting a determination of cheapest gas along a route, according to one or more aspects shown and described herein;

FIG. 21 is a flow chart depicting an example method for enhanced navigation, according one or more embodiments shown and described herein.

DETAILED DESCRIPTION

Embodiments of the present disclosure are directed to methods, systems, and media for enhanced navigation. For a given travel route, multiple types of destinations may be desired, such as a gas station, a pharmacy, and a restaurant. A driver may be travelling on a highway and want to find an exit that has all three types of destinations. Manually searching for one type of destination, such as seeing which exits have gas stations, and then separately searching for pharmacies, and then separately searching for restaurants, is very inefficient and leads to inaccuracies, particularly when trying to manually compare separate query results. Additional challenges can be encountered when trying to further incorporate particular brands, pricing information (e.g., gas prices, hotel prices, and the like), discount information (e.g., available coupons, special offers, price reductions, limited time deals, and the like), and/or membership benefits information (e.g., membership discounts, membership coupons, membership rewards, and the like). Utilizing a navigation system that allows for a more holistic approach, such as multiple destination types, which can be drilled down to particular brands, along with useful pricing information, discount information, and/or membership benefit information, can provide a much more useful and technologically superior navigation experience.

Figure 1A:
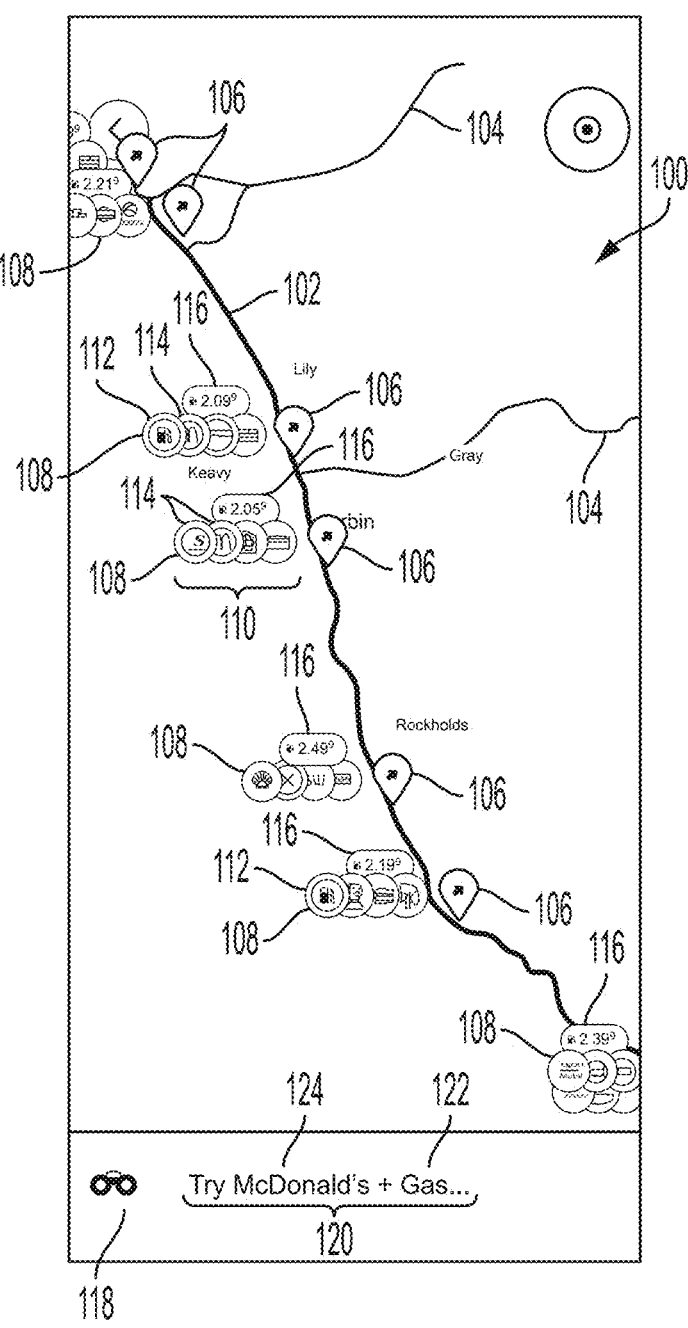
FIG. 1A schematically illustrates an exemplary interface displaying options corresponding to exits along a route, according to one or more aspects shown and described herein.

Referring now to FIG. 1A, an exemplary interface 100 displaying options corresponding to exits along a route is depicted, through which embodiments of the disclosure can be implemented. An interface 100 may be presented in the form of a graphical user interface or any other suitable type of interface, and may be touchscreen, gaze-controlled, gesture-controlled, button actuated, knob-actuated, and the like. In this embodiment, a route 102 utilizing a highway is presented in which roads 104 are accessed from the route 102 via exits 106 (which may be referred to herein as "highway mode"). A route 102 may include any path that is traversable by a car, truck, motorcycle, bicycle, aircraft, watercraft, or any other mode of transportation capable of transporting at least one person.

In response to a query 118, a result set 108 of destinations may be provided along the route 102. In this embodiment, the result set 108 comprises various destinations along various roads 104, although other destinations could be available along the highway, such as in toll plazas. Within the result set 108, there may be multiple result subsets 110. In this embodiment, each result subset 110 corresponds to an exit 106, although result subsets 110 may be grouped based upon any suitable criteria. Within the result subsets 110 are destination category icons 112 and/or destination type icons 114. Destination category icons 112 may be any general category of destination, such as gas stations, restaurants, pharmacies, grocery stores, and the like. Destination type icons 114 may be utilized to represent a particular brand or otherwise uniquely identifiable destination, such as a particular brand of gas station, restaurant, pharmacy, grocery store, and the like. In this example, particular brands displayed include McDonald's® (McDonald's® Arches design is a registered trademark of MCDONALD'S CORPORATION), Shell® (Shell® design is a registered trademark of Shell Trademark Management B.V. LIMITED LIABILITY COMPANY), and Exxon Mobil®, a registered trademark of Exxon Mobil Corporation.

A query 118 option may be utilized for a user to enter a query, which may pertain the user's current route, surroundings, and/or any other requested or unrequested geographical location. Although depicted in this embodiment as a clickable icon, a query may be entered based upon automatic prompting from the interface 100 or any other suitable user input requesting a query (gesture, gaze tracking, touch screen, text prompt, keyboard/keypad, mouse/cursor, and the like). In this embodiment, a query suggestion 120 may be presented with a category component 122 (e.g., gas stations) and/or a destination component 124 (such as McDonald's®). In this embodiment, the query suggestion 120 may be based upon prior user search history (the current user and/or other users), the current location, and/or any other suitable metric to base a query suggestion 120 upon. In other embodiments, there may be multiple or no category components 122 and/or destination components 124.

The user may click on the query 118 icon to execute the query suggestion 120, or modify/redo the query suggestion 120. In other embodiments, there may be multiple or no query suggestions 120 and/or query fields. In some embodiments, the user can select a destination component 124 and select other destination components 124 within the same or similar category components 122 and/or more broadly select the category component 122 in which the selected destination component 124 resides. For example, the user could select destination component 124 McDonald's® and replace it with one or more other brands of restaurant (i.e., different destination components 124 within the restaurant category component 122) or with the restaurant category component 122. As another example, the user may want to keep McDonald's® as a destination component 124, while replacing the category component 122 (e.g., gas stations) with specific brands of gas stations and/or other category components 122 (e.g., pharmacy, grocery store, etc.). In some embodiments, the user may simply enter their query without any query suggestion 120.

Figure 10:
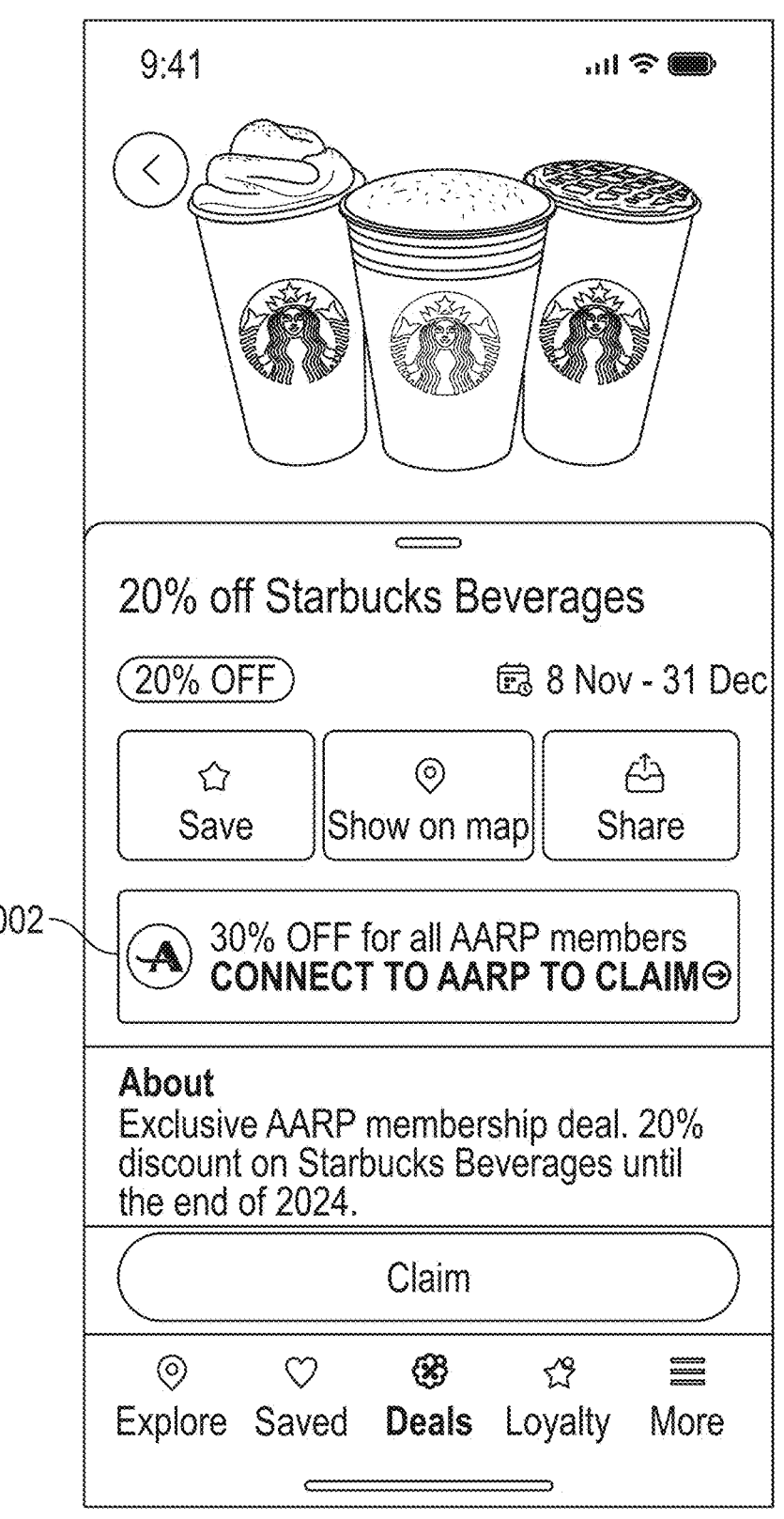
FIG. 10 schematically illustrates exemplary membership benefits associated with a particular organization that may be displayed to a user to entice the user to join the particular organization, according to one or more aspects shown and described herein.

The interface 100 may utilize any suitable database(s), such as 1018 in FIG. 10, as described below. Databases may be utilized for mapping and/or comparing data with maps, such as determining destination category icons 112, destination type icons 114, result sets 108, result subsets 110, prices, discounts, membership benefits, and the like. Mapping may be performed locally by any suitable processor(s), such as 1002 in FIG. 10 and/or remotely utilizing any suitable mapping/GPS software.

Figure 1B:
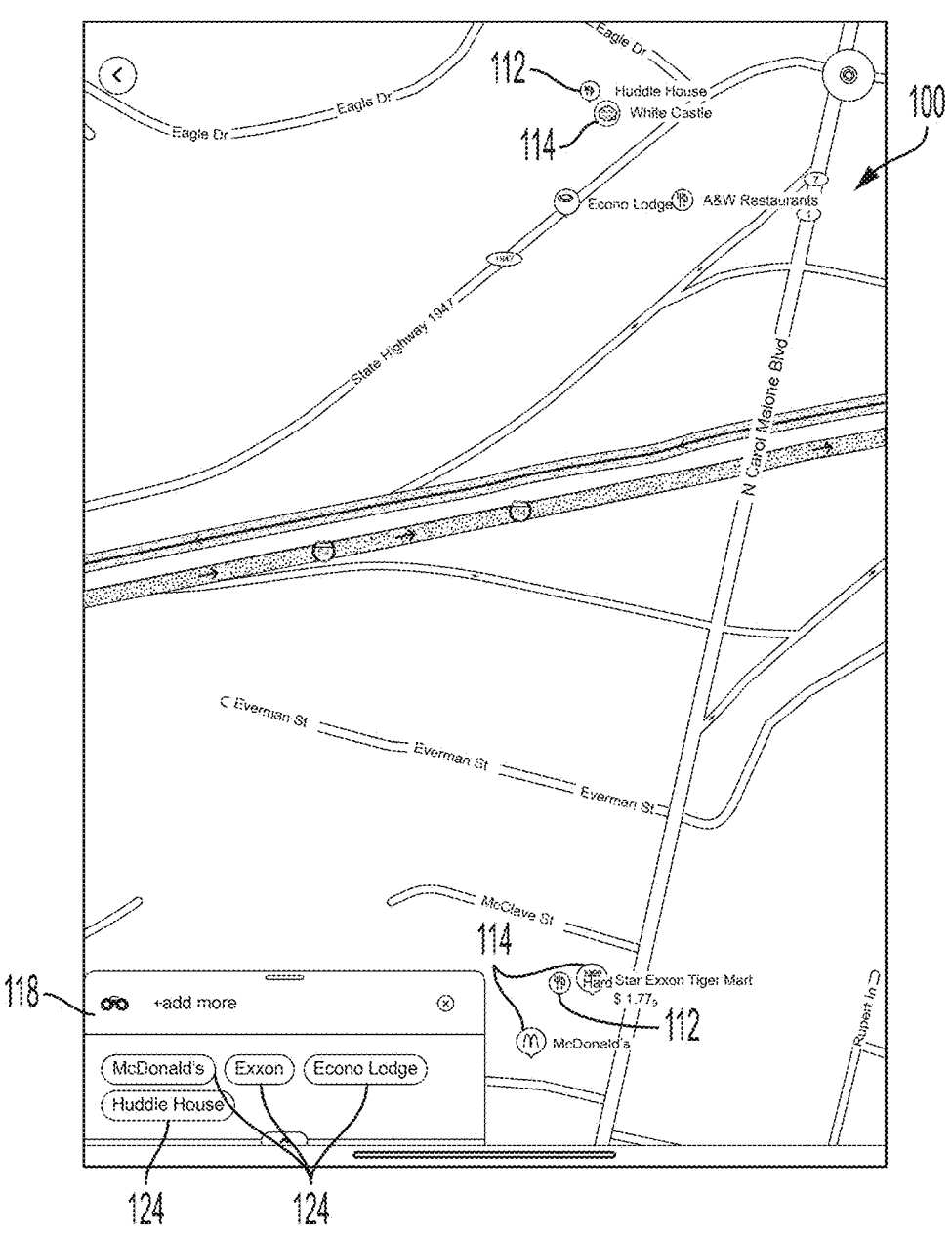
FIG. 1B schematically illustrates an exemplary interface displaying options corresponding to a selected exit along the route, according to one or more aspects shown and described herein.

Referring now to FIG. 1B, an exemplary interface 100 displaying options corresponding to exits along a route is depicted, through which embodiments of the disclosure can be implemented. In this embodiment, the user has taken an exit 106 in FIGS. 1A and 1s now presented with destination category icons 112 (two instances of a restaurant icon) and destination type icons 114 (icons indicating the brands McDonald's®, White Castle®, Star Exxon Tiger Mart®, and ECONO LODGE INN & SUITES®) within the surrounding area at the exit (which may be based on a radius from the current location or any other suitable criteria). In this embodiment, the results correspond to the query submitted in FIG. 1A, by returning McDonald's® (which was requested as a destination type or brand) and a gas station (Star Exxon Tiger Mart®). Here, Star Exxon Tiger Mart® was returned as a destination type icon 114. In other embodiments, destination category icons 112 that merely indicate a gas station (without mention to a specific brand or destination type) may be returned. White Castle® and design is a registered trademark of White Castle Management Co. A&W® is a registered trademark of A & W Concentrate. ECONO LODGE INN & SUITES® is a registered trademark of Choice Hotels International, Inc. Huddle House® is a registered trademark of Huddle House, Inc. Star Exxon Tiger Mart® is a registered trademark of Exxon Mobil Corporation.

In some embodiments, if there were no McDonald's® to be returned as results in response to the query 118, then other restaurants could be returned, as destination category icons 112 and/or as destination type icons 114. In this embodiment, even though McDonald's® was the only restaurant requested in the query 118 in FIG. 1A, more restaurant results are returned, such as A&W® and Huddle House® presented with destination category icons 112 generally indicating restaurants. In other embodiments, destination type icons 114 with specific brands may be presented even if those restaurants were not part of the query 118. In some embodiments, within the same query, a user may request one or more brands of restaurants mixed with one or more category requests (such as for restaurants generally). In some embodiments, a requested brand (such as McDonald's®) may be displayed more prominently based upon being specifically requested in a query. In other embodiments, brand prominence may be based upon predetermined brand placement (advertising agreements, price compatibility/range, and the like).

In this embodiment, the query 118 is presented with destination components 124. The query may be modified at any time, for example, by adding/removing/changing destination components 124 and/or category component 122. The updated query 118 may then be automatically run, may be run based upon further input received from a user, or may be a persistent query through which realtime data is fed. At any time, a user may request directions to one or more of the destinations. A user may select any number of destinations, and while a default route may be based upon any suitable criteria (such as selecting first destination based upon best proximity to current location), the user and/or interface 100 may re-order destinations based upon any suitable criteria (such as changing traffic conditions).

Figure 2A:
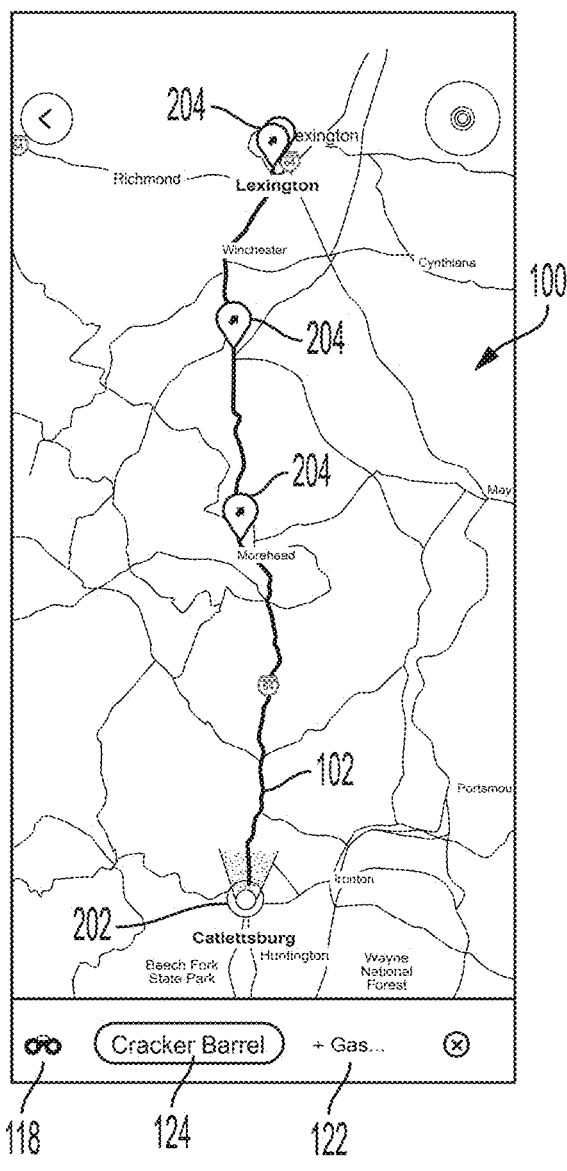
FIG. 2A schematically illustrates an exemplary interface displaying a query for locations of a restaurant chain along a route, according to one or more aspects shown and described herein.

Referring now to FIG. 2A, an exemplary interface 100 displaying a query for locations of a restaurant chain along a route, through which embodiments of the disclosure can be implemented. In this example, a user has requested result instances 204 for Cracker Barrel® (destination component 122) along their route 102, based upon the current location 202 of the user's device. Cracker Barrel® is a registered trademark of Kraft Foods Group Brands LLC or CBOCS Properties, Inc. A query suggestion 120 to add a gas station category component 122 is presented. If utilized, the result instances 204 may be updated to only show those destination component 124 Cracker Barrel® locations near a category component 122 gas station. Any suitable criteria may be utilized to determine what constitutes, for example, a Cracker Barrel® being suitably close to a gas station, such as distance, which may be defined by the user, by the interface 100, and the like.

Figure 2B:
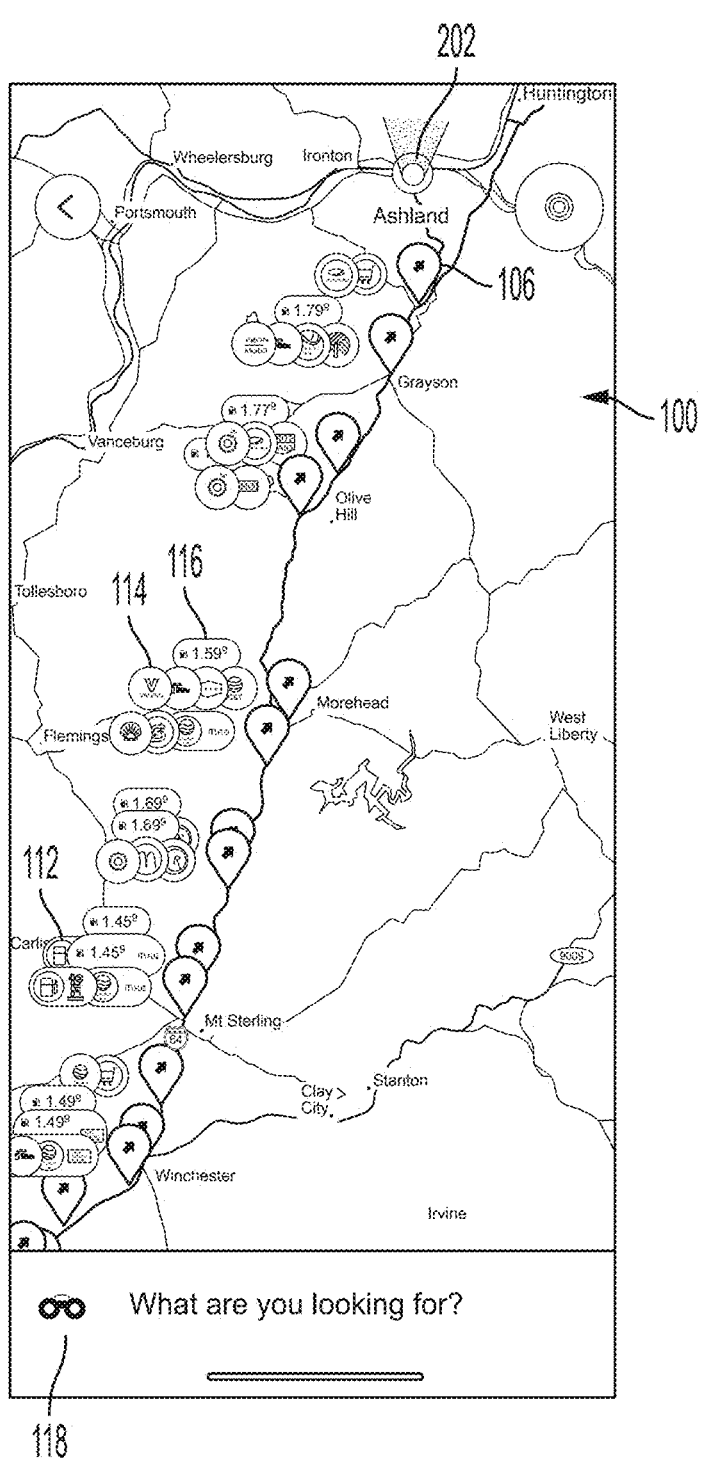
FIG. 2B schematically illustrates an exemplary interface displaying a cheapest-gas query along a route, according to one or more aspects shown and described herein.

Referring now to FIG. 2B, an exemplary interface 100 displaying a cheapest-gas query along a route 102 is depicted, through which embodiments of the disclosure can be implemented. A result set 108 is presented in the interface 100 with a result subset 110 given at each exit 106 along the route 102. In another embodiment, the result set is provided without a query, which may be based upon an identified route, the current travel direction, and/or any other suitable criteria. Here, a gas station price-per-gallon is provided for gas stations along the way (which may be referred to herein as "cheapest price mode"). Price data, such as for gas stations, may be obtained from any suitable data sources such as one or more remote databases. By way of example, not all price data for all gas stations and/or gas station prices may be available at all times. In this embodiment, prices for gas stations and prices are shown. In other embodiments, a user can specify price criteria (highest, lowest, range, and the like) such that only gas stations meeting the specified price criteria are displayed, or are displayed as an icon but no price showing. In other embodiments, price data may be used for other destination categories such as hotels, grocery stores, pharmacies, and the like. BP and design is America's Drive-In Brand Properties LLC a registered trademark of BP p.1.c. Trec design is a registered trademark of DOLLAR TREE STORES, INC. Rite Aid Shield design is a registered trademark of Rite, L.L.C. V Valero design is a registered trademark of Valero Refining and Marketing Company. AT&T design is a registered trademark of AT&T Intellectual Property. Health Mart design is a registered trademark of Health Mart Systems, Inc. Globe design (Comfort Inn®) is a registered trademark of CHOICE HOTELS INTERNATIONAL, INC. Hamilton Inn® and design is a registered trademark of HILTON INTERNATIONAL HOLDING LLC. Pizza Papa John's® and design is a registered trademark of Papa John's International, Inc.

Figure 3A:
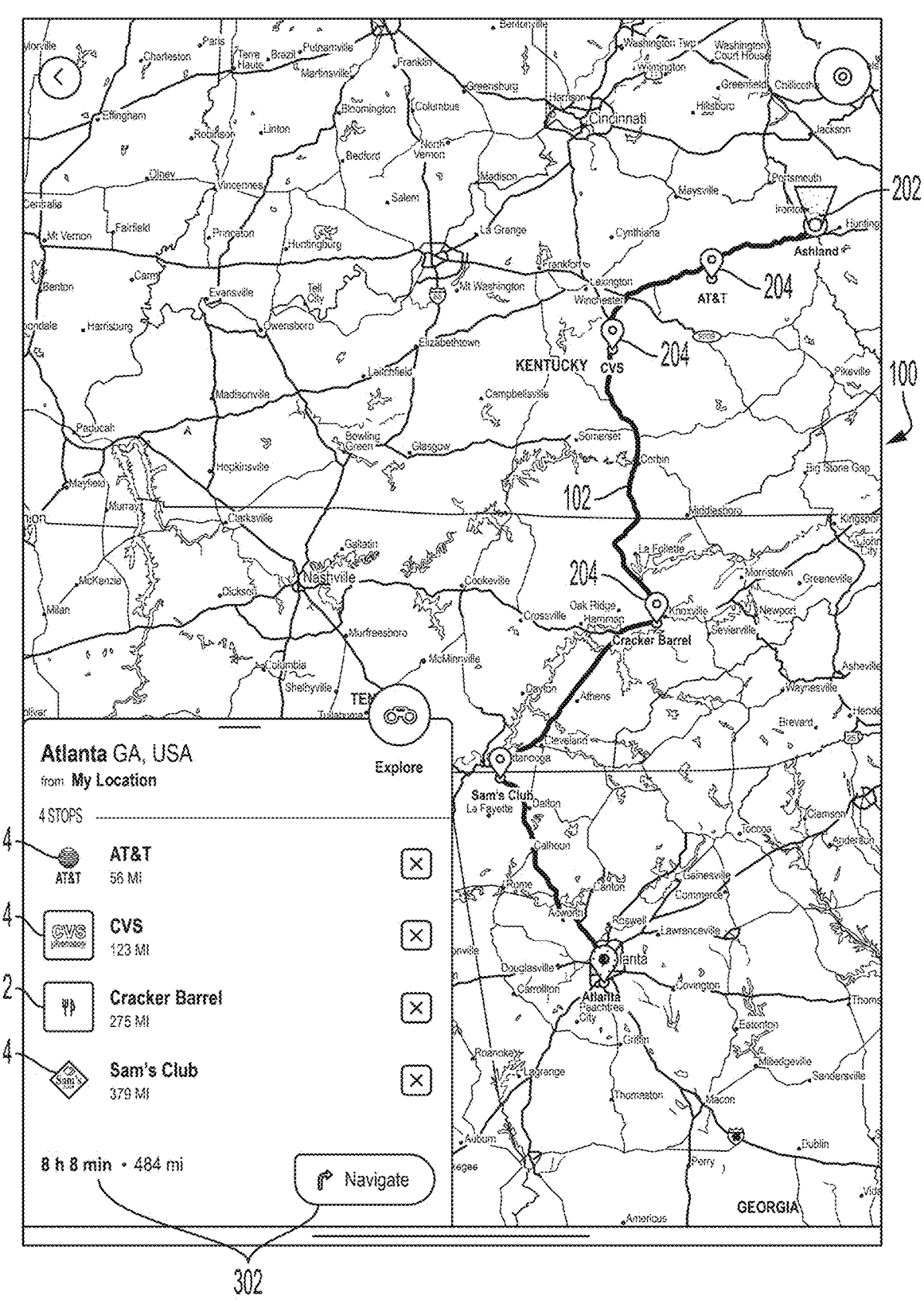
FIG. 3A schematically illustrates an exemplary interface displaying a multi-criteria query with results provided sequentially along a route, according to one or more aspects shown and described herein.

Referring now to FIG. 3A, an exemplary interface 100 displaying a multi-criteria query (which may be referred to herein as "trav match") with results provided sequentially along a route is depicted, through which embodiments of the disclosure can be implemented. Here, a user has specified multiple destination type icons 114 to plan a route, which in this example are AT&T®, CVS Pharmacy®, and Sam's Club®, along with Cracker Barrel® represented by a destination category icon 112 for restaurant, which in various embodiments may be due to the lack of availability of a particular destination type icon 114. CVS Pharmacy stylized is a registered trademark of CVS Pharmacy®, Inc., Cracker Barrel®, and Sam's Club® and diamond design is a registered trademark of WALMART APOLLO, LLC.

In this embodiment, the interface 100 determines a route with navigation information 302 from the current location to Atlanta, Georgia that provides stops for each destination (destination type icons 114 and/or destination category icons 112). Navigation information 302 may include distance, estimated travel time, and/or any other pertinent information pertaining to planning a route 102. In some embodiments, a threshold deviation distance may allow for some amount of deviation from the route 102 for a particular destination. If a destination is not available within a certain distance (which may be determined by the user or the interface) of the route 102 and/or other destinations, then alternative destination suggestions, such as other destination types within the same destination category may be provided, suggested, or automatically utilized.

Figure 3B:
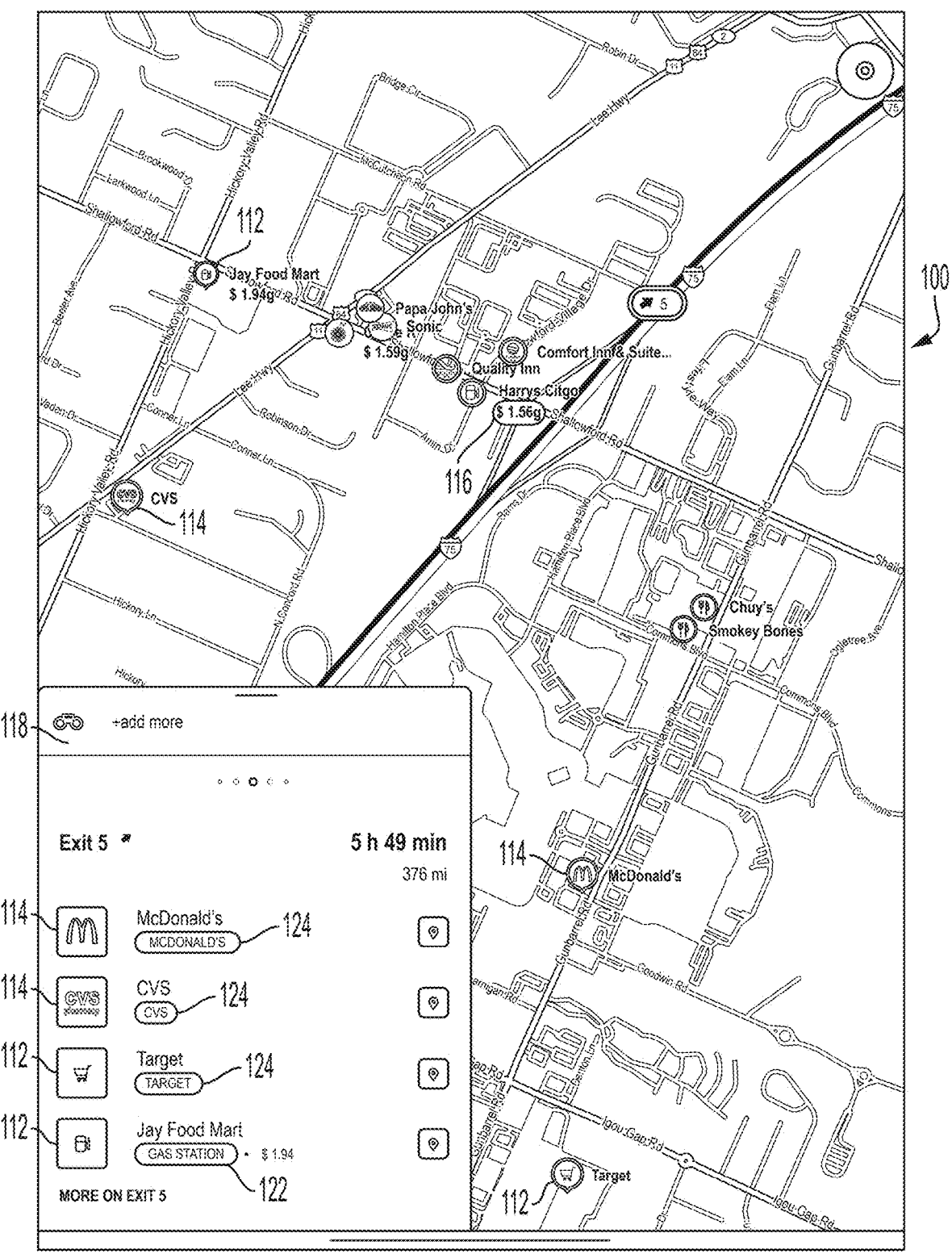
FIG. 3B schematically illustrates an exemplary interface displaying a multi-criteria query with mixed brand-specific and generic results provided at an exit along a route, according to one or more aspects shown and described herein.

Referring now to FIG. 3B, an exemplary interface 100 displaying a multi-criteria query with mixed brand-specific and generic results provided at an exit along a route is depicted, through which embodiments of the disclosure can be implemented. In this embodiment, a user views an exit along their route utilizing destination components 124 McDonalds®, CVS Pharmacy®, and Target®, and category component 122 Jay Food Mart. Sonic and design is a registered trademark of AMERICA'S DRIVE-IN BRAND PROPERTIES LLC. Quality Inn® and design is a registered trademark of Choice Hotels International, Inc. Citgo Triangle design is a registered trademark of CITGO PETROLEUM CORPORATION. Chuy's® stylized is a registered trademark of CHUY'S OPCO, INC. Smokey Bones design is a registered trademark of Barbeque Integrated, Inc. Target design is a registered trademark of Target Brands, Inc.

A destination category icon 112 may be utilized with destination component 124, such as if a particular brand icon is not available, or vice versa. Additional potential destinations may also be provided, such as other restaurants so that the user can have a greater selection, such as additional restaurant choices even if the user previously indicated a particular brand preference.

Figure 4A:
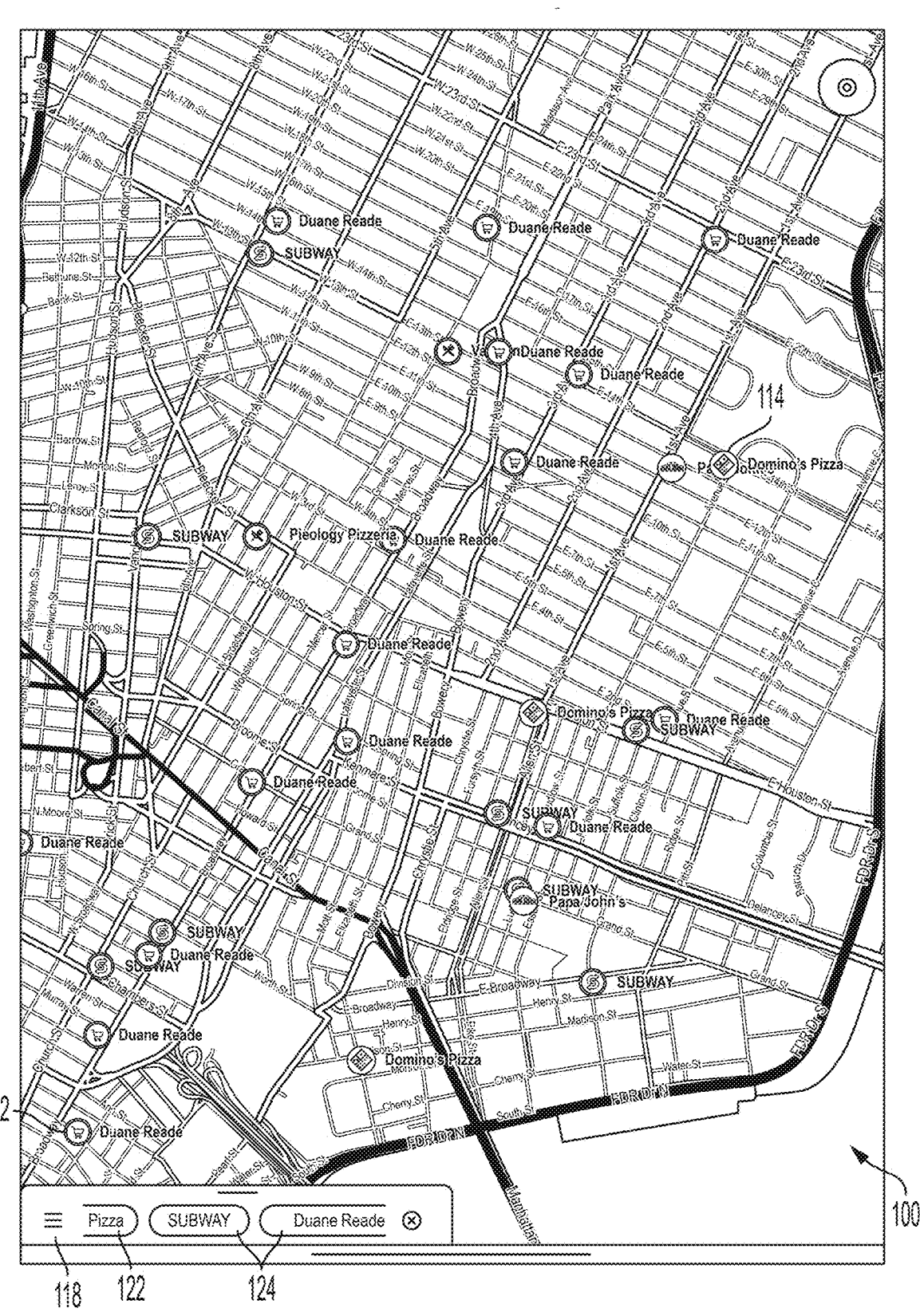
FIG. 4A schematically illustrates an exemplary interface displaying a multi-criteria query utilized within a city, according to one or more embodiments shown and described herein.

Referring now to FIG. 4A, an exemplary interface 100 displaying a multi-criteria query utilized within a city is depicted, through which embodiments of the disclosure can be implemented. In this embodiment (which may be referred to herein as "city mode"), a user utilizes a query 118 for a category component 122 (pizza) and destination components 124 (SUBWAY® and DUANE READE®). DUANE READE® is a registered trademark of DUANE READE GENERAL PARTNERSHIP. S design is a registered trademark of SUBWAY IP LLC. DOMINO'S PIZZA design is a registered trademark of DOMINO'S IP HOLDER LLC LIMITED LIABILITY COMPANY. PIEOLOGY P PIZZERIA design is a registered trademark of The Little Brown Box Pizza, LLC.

In this embodiment, a user may search the surrounding area for category components 122 and/or destination components 124, rather than being based upon a highway route from a starting point to a destination. Other related category components 122 and/or destination components 124 may also be provided, which can provide the user with more options, particularly if suitable substitute options are available for one destination type/category near one of the other destination types/categories that were part of the query 118. In this embodiment, results are based upon a radius of current or any other specified location, where the radius may be define by the user or the interface 100.

Figure 4B:
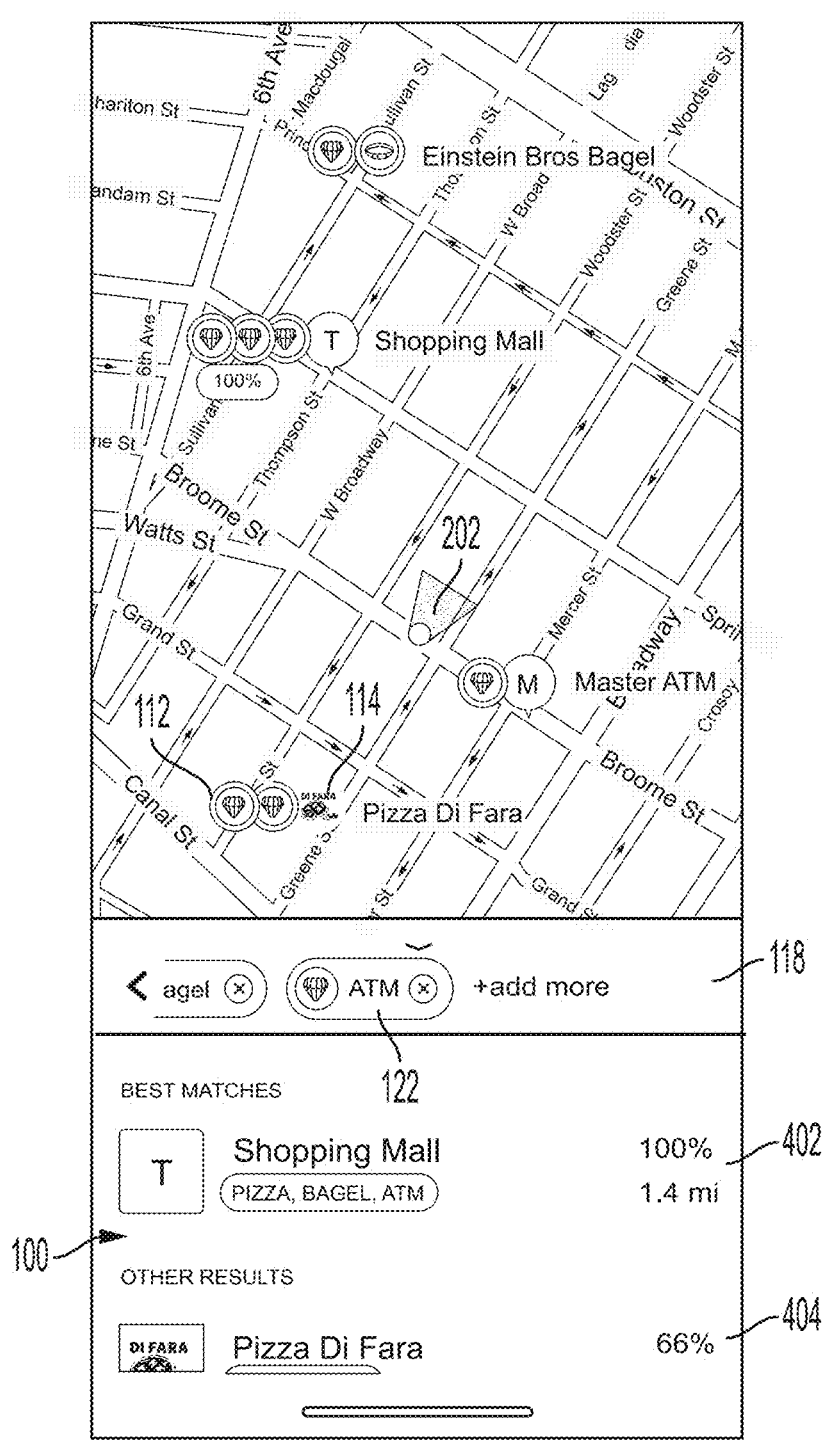
FIG. 4B schematically illustrates an exemplary interface displaying clustered results from a multi-criteria query utilized within a city, according to one or more aspects shown and described herein.

Referring now to FIG. 4B, an exemplary interface 100 displaying clustered results from a multi-criteria query utilized within a city is depicted, through which embodiments of the disclosure can be implemented. In this embodiment, a user has entered a query within a city utilizing category components 122 for a bagel shop, a pizza shop, and an ATM. Locations may be scored based upon meeting the criteria of the query 118. A shopping mall is scored as a best match 402 at 100% for having an ATM, a pizza place, and a bagel place. In this embodiment, match scores may be displayed on one or more of the locations, such as the shopping mall displaying a 100% on the map view. Other results 404 include a pizza place scored at 66% for being near an ATM but not near a bagel place. At another location, an Einstein Bros Bagel® is located near an ATM but not near a pizza place. Einstein Bros Bagel® is a registered trademark of EIN-STEIN AND NOAH CORP. In this embodiment, a threshold distance that constitutes "near" may be user-defined or determined by the interface 100. In some embodiments, a user or the interface may determine a threshold amount to determine which matches are displayed on the map and/or in the results list.

Figure 5A:
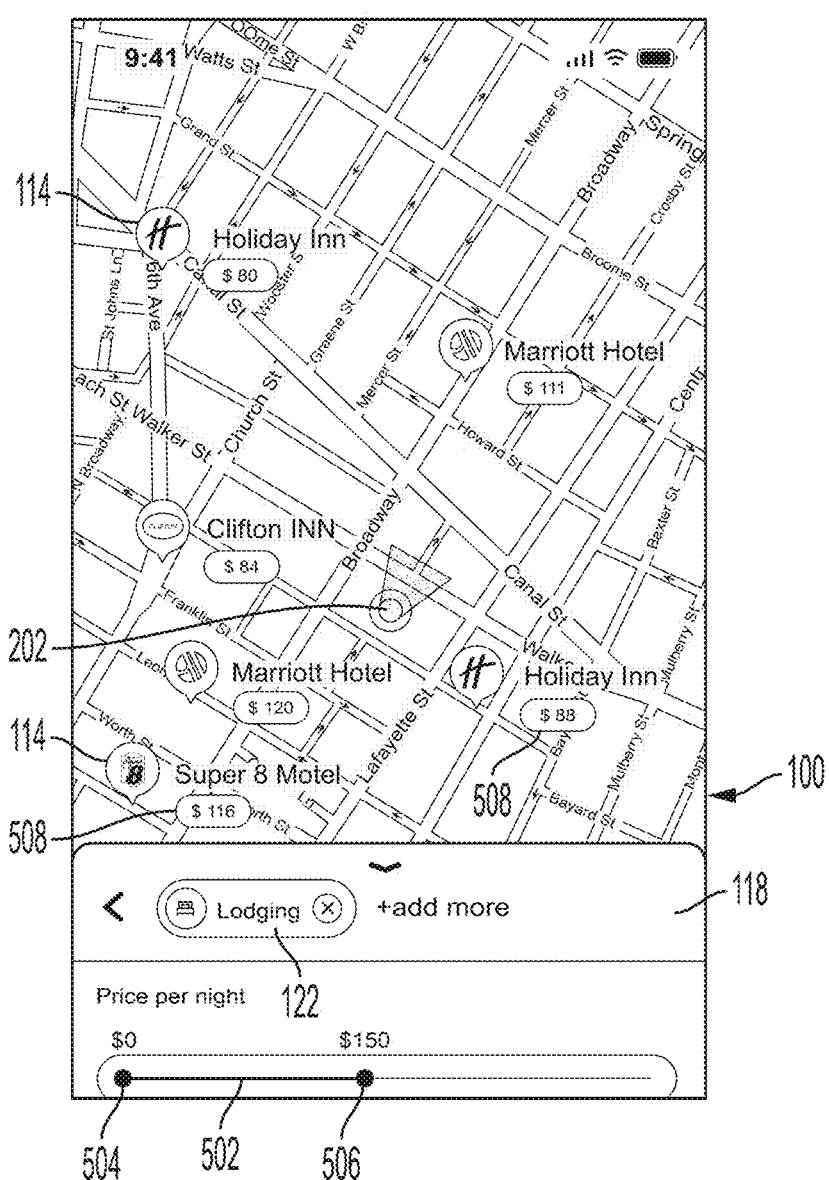
FIG. 5A schematically illustrates an exemplary interface displaying a city navigation-based hotel finder with price options, according to one or more aspects shown and described herein.

Referring now to FIG. 5A, an exemplary interface 100 displaying a city navigation-based hotel finder with price options is depicted, through which embodiments of the disclosure can be implemented. In this embodiment, a category component 122 for lodging has been selected for a query 118. Various hotels, such Holiday Inn®, Marriott®, and Super 8® are displayed on the map view with price indicators 508 based upon a price slider 502 with a minimum price 504 and a maximum price 506. Holiday Inn® and design is a registered trademark of Six Continents Hotels, Inc. Marriott Hotel® is a registered trademark of MAR-RIOTT INTERNATIONAL, INC. Super 8 Motel design is a registered trademark of 97034 CORPORATION. In some embodiments, price may be based upon various selectable time criteria (such as weekly, and the like) and may allow the exclusion of below a minimum price 504 or above a maxi-mum price 506. In this embodiment, the slider may be adjusted to effect the results on the map view in real-time. Other category components 122 and/or destination compo-nents 124 may be added as well.

Figure 5B:
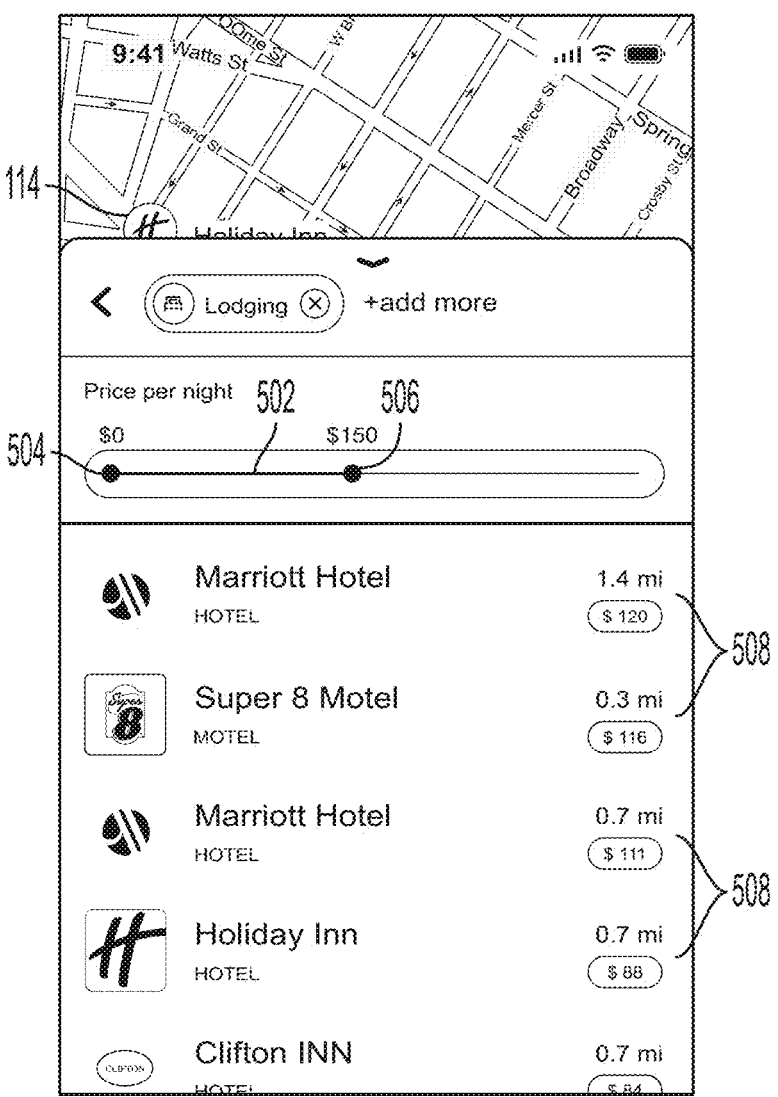
FIG. 5B schematically illustrates an exemplary interface displaying a city navigation-based hotel price options, according to one or more embodiments shown and described herein.

Referring now to FIG. 5B, an exemplary interface 100 displaying a city navigation-based hotel price options is depicted, through which embodiments of the disclosure can be implemented. Continuing with the embodiment of FIG. 5B, a list view of the hotel best results is presented. The hotels are presented based upon price in descending order, although any suitable sorting criteria (distance, alphabetical, and the like). In this embodiment, the slider may be adjusted to effect the list view results in real-time.

In some embodiments, the navigation system described herein may be additionally configured to display discount information and/or membership benefits information. For example, one or more of the exemplary interfaces depicted and described above with respect to FIGS. 1A-5B may display discount information and/or membership benefits information for one or more query results (e.g., requested categories, requested destinations, categories and/or desti-nations within a threshold distance, and/or the like). Dis-count information and/or membership benefits information may be displayed when the navigation system is being utilized in a navigation mode where a user is traveling any type of road (e.g., county roads, frontage roads, interstate highways, state highways, etc.), a highway mode (e.g., a more specific type of navigation mode) as depicted and described above with respect to at least FIGS. 1A-3B, 14A, and/or 14B, a city mode as depicted and described above with respect to at least FIGS. 4A-5B, and/or a route planning mode with trav match as depicted and described above with respect to at least FIG. 3A.

As used herein, "discount information" may refer to information about price reductions and/or special offers provided by a retailer, which may lower the price on a product and/or service offered to a user. Example discount information may include information about coupons offered by retailers, buy-one-get-one (BOGO) deals, percentage discounts (e.g., a product or a service is reduced by a percentage), seasonal discounts, volume discounts, early bird discounts, flash sales, and/or free shipping, among others. For instance, exemplary discount information may include a coupon for 20% off of drinks purchased at a local coffee shop, an indication of a summer sale at a large department store, and/or a special offer for reduced baseball tickets for a baseball game occurring at a nearby baseball stadium.

Further, as used herein, "membership benefits informa-tion" may refer to information about perks that a member of an organization may receive in exchange for their member-ship fee and/or loyalty. In some embodiments, example membership benefits (or "perks") information may include information about membership-related discounts. Member-ship-related discount information may include information about one or more of the exemplary discounts listed above with respect to discount information; however, these dis-counts may be tied to specific membership(s) that a user has with one or more organizations. For example, a user may be a member of two organizations. The first organization may offer a first set of membership discounts to its members (without providing such discounts to other non-members of the organization), while the second organization may offer a second set of membership discounts to its members (without providing such discounts to other non-members of the organization). The first set of membership discounts may be different than the second set of membership discounts, or may include at least one membership discount that is offered by both organizations. Example organizations that offer membership benefits may include drink and food retailers (e.g., such as Starbucks® with the associated rewards pro-gram), organizations tailored to a specific demographic of people (e.g., such as AARP®, which offers a variety of benefits to older adults), hospitality companies (e.g., such as Choice Hotels International, Inc.), and/or the like.

Exemplary display of discount information is depicted and described below with respect to FIGS. 6A-6C, 7, and 8. Further, exemplary display of membership benefits infor-mation is depicted and described below with respect to FIGS. 9A-9C, 10, 11, and 12. FIGS. 13A-13D provide additional details related to connecting a user's membership account, such as for the display of membership benefits information, via an exemplary interface, associated with that specific membership account.

Figure 6A:
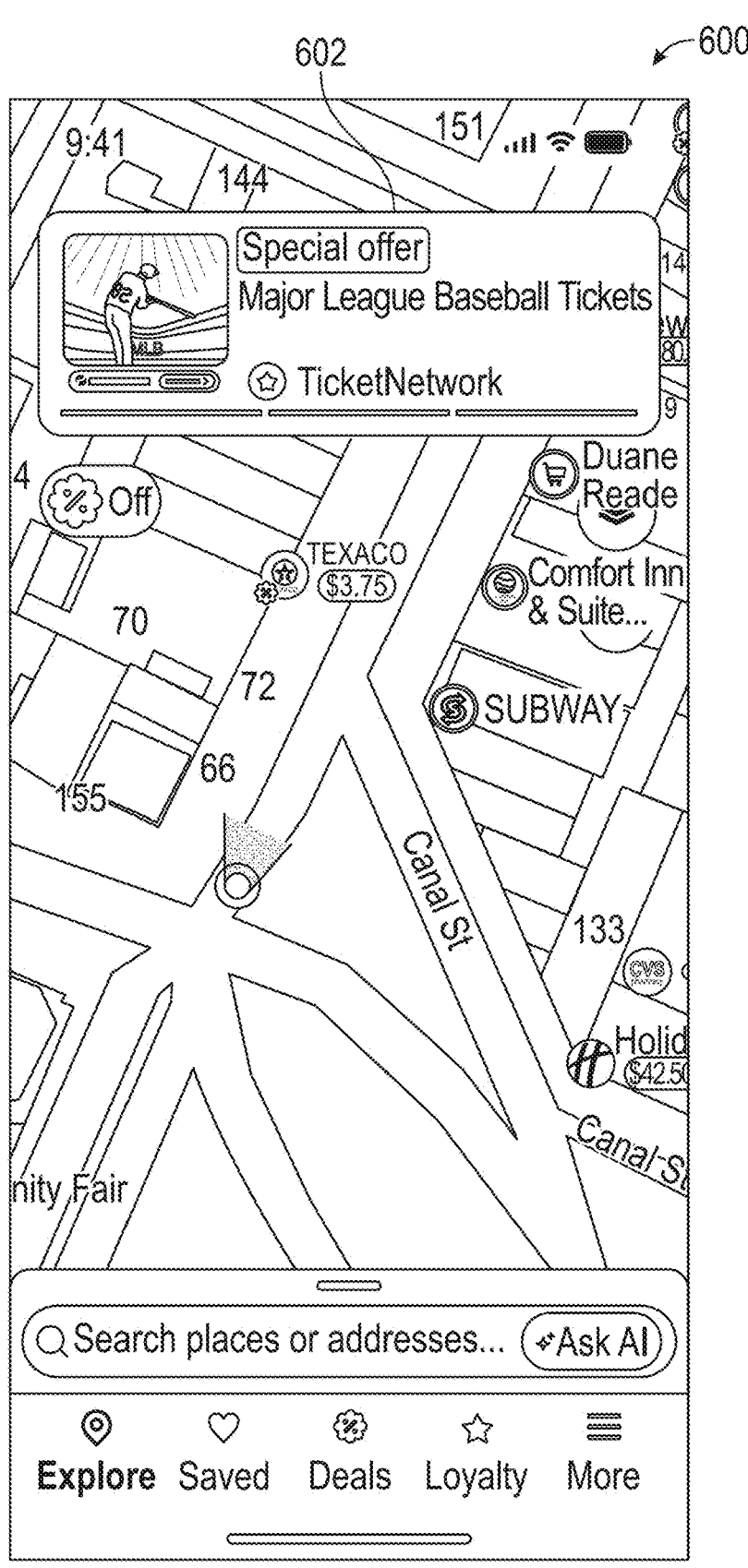
FIG. 6A schematically illustrates an exemplary interface displaying results from a query with discount information, according to one or more aspects shown and described herein.
Figure 6B:
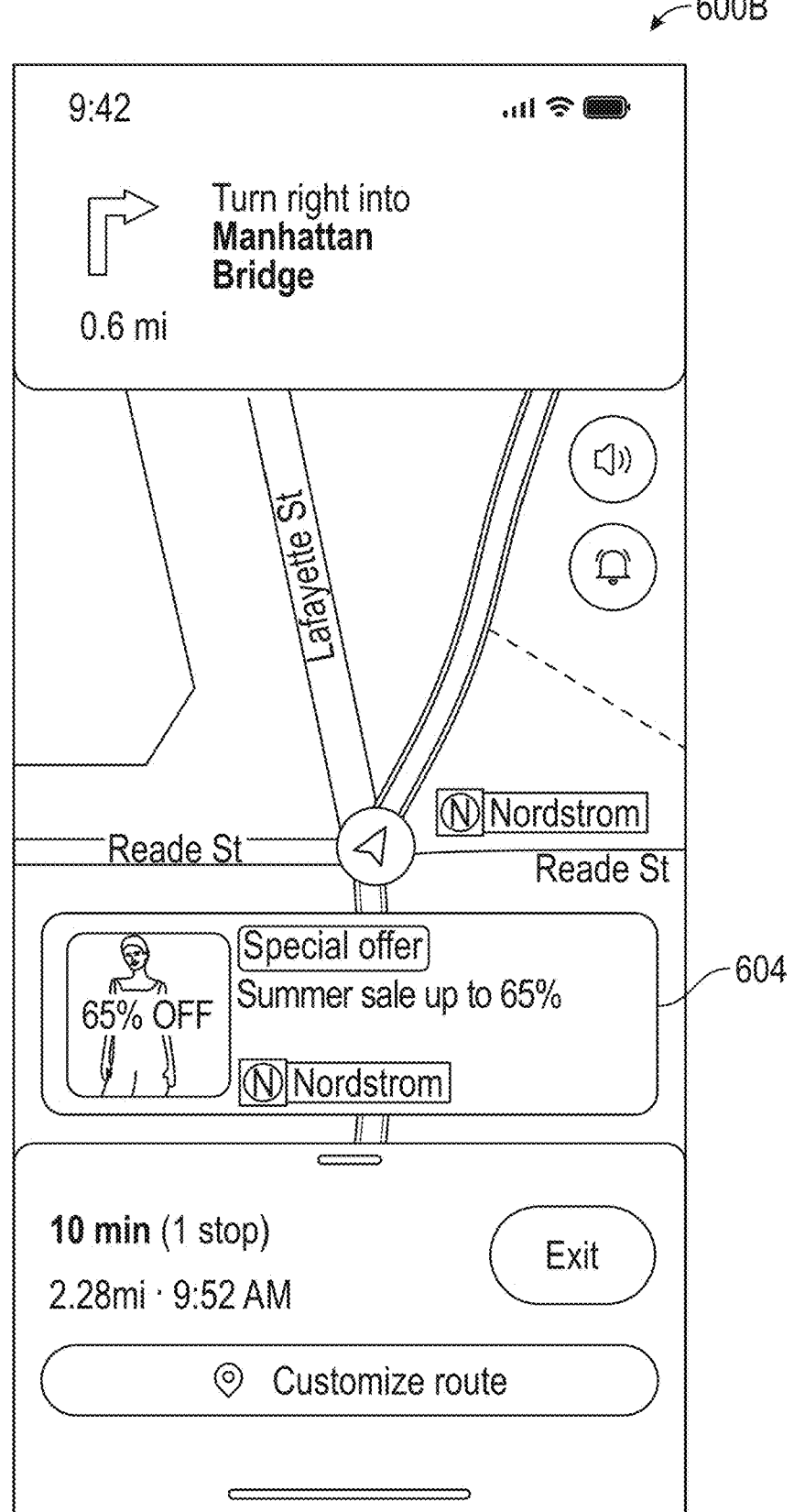
FIG. 6B schematically illustrates another exemplary interface displaying results from a query with discount information, according to one or more aspects shown and described herein.
Figure 6C:
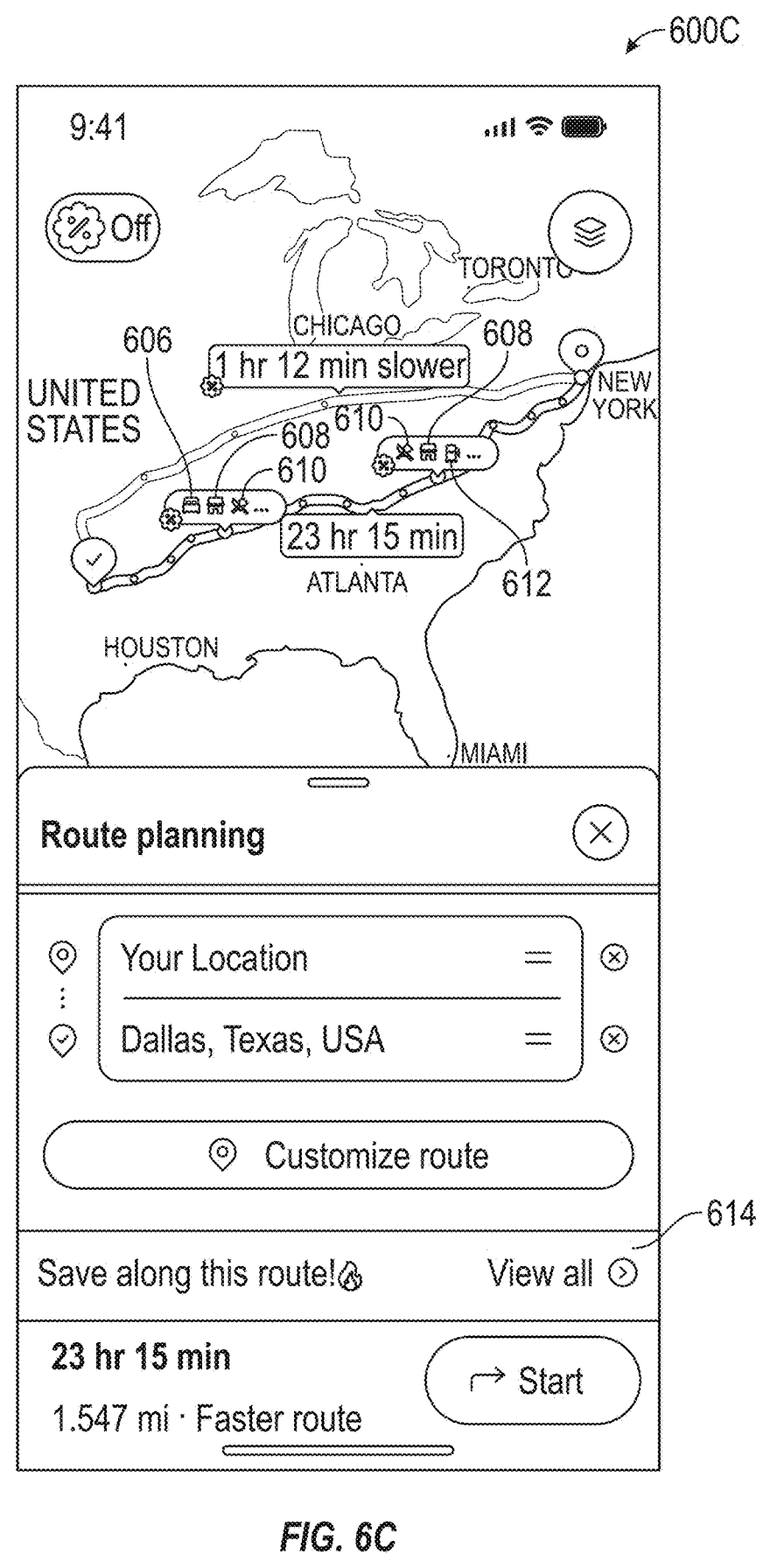

Referring now to FIGS. 6A-6C, exemplary interfaces 600A, 600B, 600C displaying results from a query with discount information are depicted, respectively, through which embodiments of the disclosure may be implemented. More specifically, exemplary interface 600A of FIG. 6A displays discount information for query results in a city (e.g., when the navigation system is being used in a city mode). The query results may include destination types within a radius (e.g., a configured radius or a radius specified by a user) from a current location of the user within the city. For example, as shown in FIG. 6A, the query results may include a Texaco® gas station (e.g., Texaco® is a registered trade-mark of Chevron Intellectual Property LLC), a CVS Phar-macy®, a Holiday Inn®, a Subway®, a Duane Read®, a Comfort Inn®, and Yankee Stadium® (e.g., Yankee Sta-dium®, a baseball stadium in New York, is a registered trademark of The New York Yankees). It is noted that the query result for Yankee Stadium® is not shown in FIG. 6A as it is hidden behind the pop-up 602 in FIG. 6A (e.g., pop-up 602 is a small window that may be displayed on top of navigation system's map). The discount information included in exemplary interface 600A includes a special offer for reduced major league baseball tickets for a baseball game occurring at Yankee Stadium®. This special offer is provided by TicketNetwork®, which is an online marketplace for buying and selling event tickets (e.g., TicketNetwork® is a registered trademark of TicketNetwork, Inc.). This discount information is provided via pop-up 602 in exemplary interface 600A.

Exemplary interface 600B of FIG. 6B displays discount information for query results when the navigation system is being used in a navigation mode, such as to navigate to a specified destination location (e.g., specified by a user using the navigation system) using one or more country roads, interstate highways, state highways, etc. The query results may include destination types along a route from a current location of the user to the specified destination location. For example, as shown in FIG. 6B, the query results may include a Nordstrom®, which is a luxury department store chain (e.g., Nordstrom® is a registered trademark of NIHC, Inc.). The discount information included in exemplary interface 600B includes a special offer for a summer sale at Nordstrom®, which includes up to 65% off summer-related clothing. This special offer is provided by Nordstrom®. This discount information is provided via pop-up 604 in exemplary interface 600B. In some embodiments, pop-up 604, with the discount information, may appear when a current location of the user is within a threshold distance of the Nordstrom®.

Exemplary interface 600C of FIG. 6C displays discount information for query results when the navigation system is being used in a route planning mode with trav match. In this example, a user has specified that they desire to travel from their current location to Dallas, Texas, USA (e.g., an example destination location specified by the user). The user has also specified multiple destination categories that they desire to stop at along the route, including lodging (e.g., shown via category icon 606), pharmacies (e.g., shown via category icon 608), restaurants (e.g., shown via category icon 610), and gas stations (e.g., shown via category icon 612). Based on this input, exemplary interface 600C determines two routes from the current location of the user to Dallas, Texas, USA, which may be traveled by the user, and which may include one or more of the specified destination categories. Thus, the query results may include the destination categories which are shown as destination categories icons 606-612 in FIG. 6C. The discount information included in exemplary interface 600C includes multiple savings that may be realized by the user while traveling along the route. The multiple savings are indicated to the user in exemplary interface 600C via a pop-up 614. In some embodiments, pop-up 614, with this discount information, may appear in exemplary interface 600C prior to the user selecting one of the two displayed routes (e.g., based on the user pressing the "Start" button provided in exemplary interface 600C).

A user may interact with discount information that is displayed to the user when using the navigation system, such as to obtain additional details about a discount and/or accept a discount. For example, in FIG. 6A, a user may click on the pop-up 602 to learn more details about the special offer for reduced major league baseball tickets, including information such as an amount of discount that is being offered, the discounted price of the tickets, the number of tickets that are available, when the special offer expires, and/or the like. Further, in some cases, the user may click on the pop-up 602 to accept the special offer and purchase the baseball tickets at the discounted price.

Figure 7:
FIG. 7 schematically illustrates exemplary discount details that may be displayed to a user via an exemplary interface, according to one or more aspects shown and described herein.

FIG. 7 depicts exemplary discount details that may be displayed to a user via an exemplary interface 700. As shown in FIG. 7, the example discount may include a special offer for reduced price Starbucks® beverages. Additional details related to this discount may include an indication of the percentage that the beverages are reduced by (e.g., 20% off Starbucks® beverages) and an indication as to when the offer is valid (e.g., valid between April 20$^{th}$ through May 5$^{th}$). Further, in this example, the additional details may include an indication that a greater discount (e.g., a 30% discount instead of a 20% discount) may be given to users that are AT&T® members (e.g., users that pay for internet and/or cell phone service through AT&T®, which is a registered trademark of AT&T Intellectual Property). In some cases, this additional detail may be used to incentivize the user to switch to using AT&T® as its service provider. In cases where the user determines to claim the discount (e.g., the 20% off Starbucks® beverages discount), the user may interact with (e.g., click on) the "Claim" button 702 provided via the exemplary interface 700.

Figure 8:
FIG. 8 schematically illustrates exemplary discount information that may be displayed to a user, via an exemplary interface, at random, according to one or more aspects shown and described herein.

In some embodiments, discount information may be randomly displayed to a user. For example, when using the navigation system described herein, a pop-up window, which includes discount information, may be displayed to a user. In some embodiments, this pop-up window may be displayed when the navigation system is being used in a navigation mode, in a highway mode, in a city mode, in a route planning mode with trav match, and/or when the navigation system is running and not being used for any of the aforementioned modes. FIG. 8 depicts example discount information that may be randomly displayed to a user of the navigation system. As shown in FIG. 8, the discount information displayed via an exemplary interface 800 may include information about a special offer for reduced price Starbucks® beverages for AT&T® members only. In addition to receiving a 30% discount on Starbucks® beverages, users that switch to using AT&T® as their service provider may be eligible to receive a $250 gift card to use towards the purchase of a new cellular phone with AT&T®, according to the discount information displayed via exemplary interface 800. In some cases, this additional perk may be used to incentivize the user to switch to using AT&T® as its service provider. In cases where the user determines to switch to using AT&T® as its service provider and claim the discount (e.g., the 30% off Starbucks® beverages discount and the $250 gift card), the user may interact with (e.g., click on) the "Switch to AT&T®" button 802 provided via exemplary interface 800. Additional steps may follow to set up an account with AT&T®.

Figure 9A:
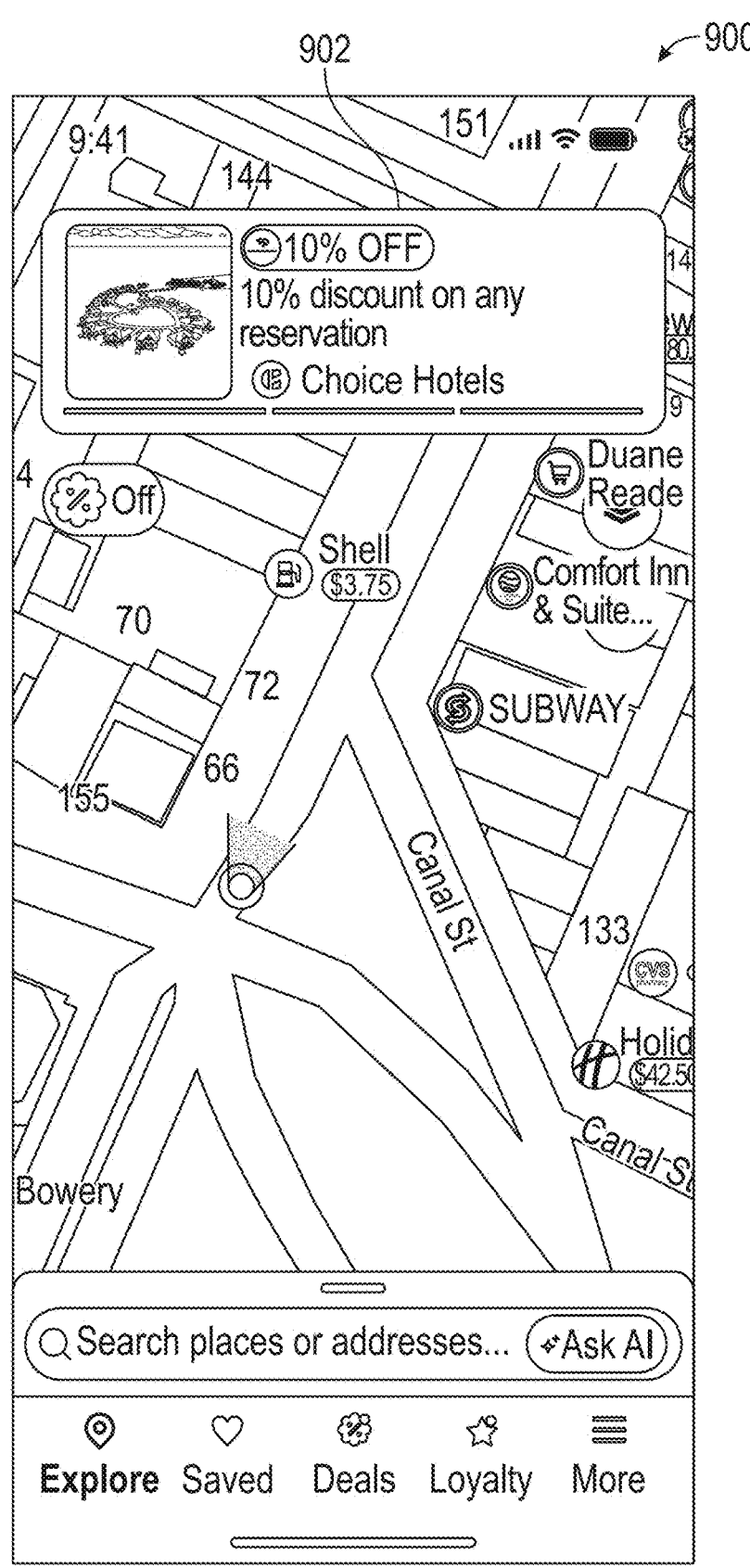
FIG. 9A schematically illustrates an exemplary interface displaying results from a query with membership benefits information, according to one or more aspects shown and described herein.
Figure 9B:
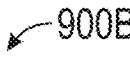
FIG. 9B schematically illustrates another exemplary interface displaying results from a query with membership benefits information, according to one or more aspects shown and described herein.
Figure 9C:
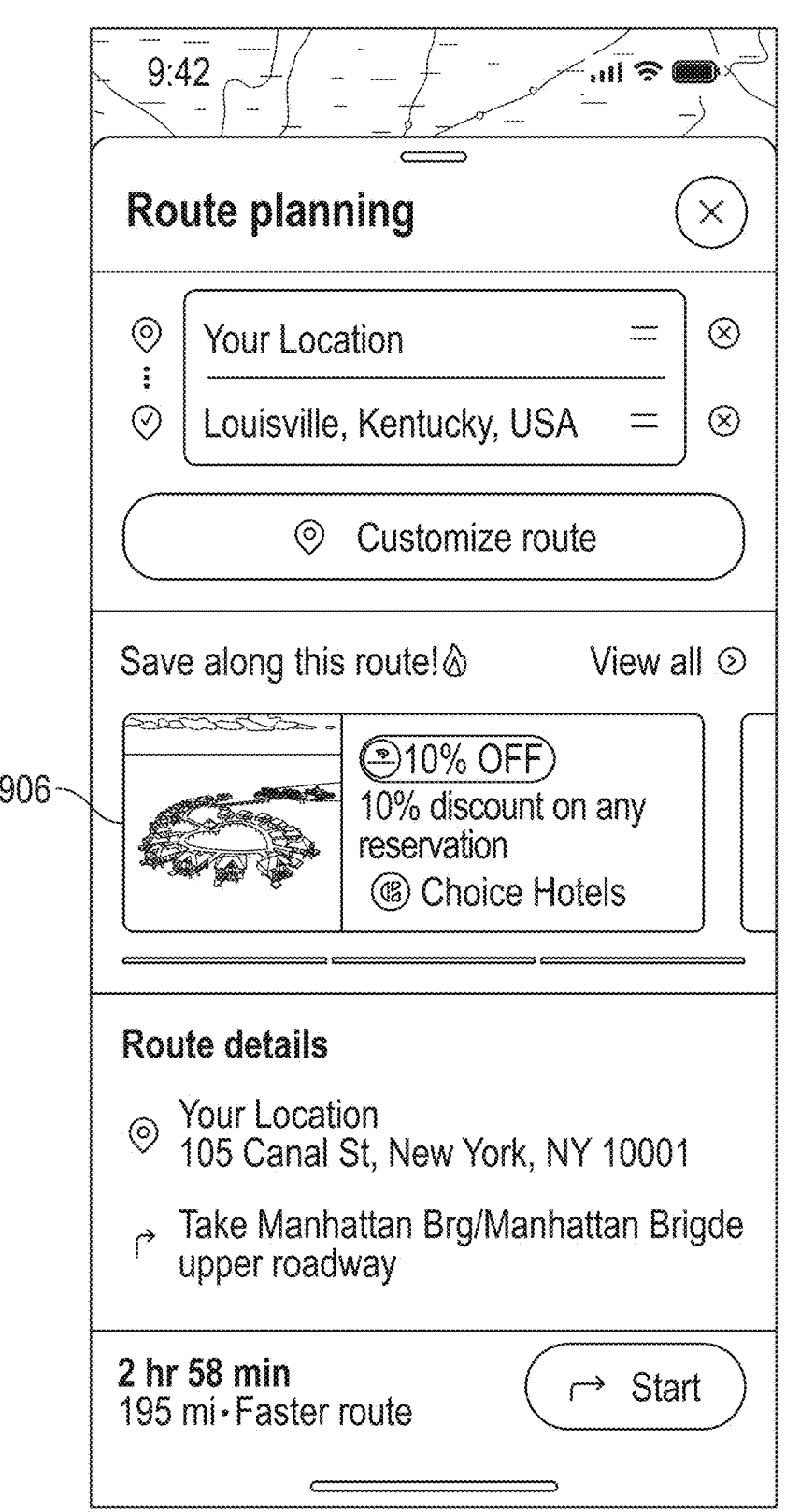
FIG. 9C schematically illustrates another exemplary interface displaying results from a query with membership benefits information, according to one or more aspects shown and described herein.

Referring now to FIGS. 9A-9C, exemplary interfaces 900A, 900B, 900C displaying results from a query with membership benefits information are depicted, respectively, through which embodiments of the disclosure may be implemented. Although not meant to be limiting to this particular example, the membership benefits information displayed via exemplary interfaces 900A, 900B, 900C may include information about discounts available to a user that has an active Choice Privileges® membership and has connected their Choice Privileges® membership account to the navigation system. Choice Privileges® is an example hotel rewards program that offers its members exclusive perks, such as exclusive rates, rewards, and/or free nights, among other benefits. Choice Privileges® is a registered trademark of Choice Hotels International, Inc. Additional details regarding the connection of a membership account to the navigation system are provided below with respect to FIGS. 13A-13D.

Exemplary interface 900A of FIG. 9A displays membership benefits information, e.g., Choice Privileges® membership benefits information, for query results in a city (e.g., when the navigation system is being used in a city mode).

The query results may include destination types within a radius (e.g., a configured radius or a radius specified by a user) from a current location of the user within the city. For example, as shown in FIG. 9A, the query results may include a Shell® gas station, a CVS Pharmacy®, a Holiday Inn®, a Subway®, a Duane Reade®, and a Comfort Inn®. The membership benefits information included in exemplary interface 900A includes a special offer for a 10% discount on any hotel reservation. The membership benefits information is provided via pop-up 902 in exemplary interface 900A. In this example, the membership benefits information may be displayed via exemplary interface 900A based on the user being a Choice Privileges® member, given the special offer is provided as an exclusive membership benefit for Choice Privileges® members. Further, in this example, the membership benefits information may be displayed via exemplary interface 900A based on the query results including at least two hotels, e.g., the Holiday Inn® and the Comfort Inn®, where the special offer may be utilized.

Exemplary interface 900B of FIG. 9B displays membership benefits information, e.g., Choice Privileges® membership benefits information, for query results when the navigation system is being used in a navigation mode, such as to navigate to a specified destination location (e.g., specified by a user using the navigation system) using one or more country roads, interstate highways, state highways, etc. The query results may include destination types along a route from a current location of the user to the specified destination location. For example, as shown in FIG. 9B, the query results may include a Comfort Inn®. The membership benefits information included in exemplary interface 900B includes a special offer for a 10% discount on any hotel reservation. The membership benefits information is provided via pop-up 904 in exemplary interface 900B. In some embodiments, pop-up 904 with the membership benefits information may appear when a current location of the user is within a threshold distance of the Comfort Inn®. In this example, the membership benefits information may be displayed via exemplary interface 900B based on the user being a Choice Privileges® member, given the special offer is provided as an exclusive membership benefit for Choice Privileges® members. Further, in this example, the membership benefits information may be displayed via exemplary interface 900B based on the query results including at least one hotel, e.g., the Comfort Inn®, where the special offer may be utilized.

Exemplary interface 900C of FIG. 9C displays membership benefits information, e.g., Choice Privileges® membership benefits information, for query results when the navigation system is being used in a route planning mode with trav match. In this example, a user has specified that they desire to travel from their current location to Louisville, Kentucky, USA (e.g., an example destination location specified by the user). Although not shown in FIG. 9C, the user may have also specified multiple destination categories that they desire to stop at along the route, including at least lodging and hotels. Based on this input, exemplary interface 900C determines one or more routes from the current location of the user to Louisville, Kentucky, USA, which may be traveled by the user, and which may include the specified destination categories. Thus, the query results may include the destination categories which are available along one or more of the routes. In this example, the query results may include at least one hotel located along one or more of the routes determined via the navigation system (although not shown in FIG. 9C). The membership benefits information included in exemplary interface 900C includes at least a special offer for a 10% discount on any hotel reservation. The membership benefits information is provided via pop-up 906 in exemplary interface 900C. In this example, the membership benefits information may be displayed via exemplary interface 900C based on the user being a Choice Privileges® member, given the special offer is provided as an exclusive membership benefit for Choice Privileges® members. Further, in this example, the membership benefits information may be displayed via exemplary interface 900C based on the query results including at least the one hotel where the special offer may be utilized.

In some embodiments, membership benefits for members of a particular organization may be displayed to a user, while utilizing the navigation system, to entice the user to join the particular organization. As an illustrative example, FIG. 10 depicts exemplary AARP® membership benefits that may be displayed to a user to persuade the user to join AARP® and receive at least the displayed benefits. As shown, the exemplary AARP® membership benefits may be displayed to a user via an exemplary interface 1000. The AARP® membership benefits may include a special offer for further reduced price Starbucks® beverages, which is exclusively available to AARP® members. For example, instead of receiving only 20% off Starbucks® beverage purchases, AARP® members may receive an increased 30% off Starbucks® beverage purchases. In this example, the user may not currently be an AARP® member. Thus, in some cases, the AARP® membership benefits may be displayed to incentivize the user to establish a membership account with AARP® and connect this membership account with the navigation system to realize the increased discount associated with being an AARP® member. In cases where the user determines to join AARP® and claim the displayed discount (e.g., the 30% off Starbucks® beverages discount), the user may interact with (e.g., click on) the "CONNECT TO AARP TO CLAIM" pop-up 1002 provided via the exemplary interface 1000. In some embodiments, interacting with pop-up 1002 may re-direct the user to a webpage associated with AARP® to enable the user to create a membership account with this organization.

In some embodiments, such as where the user already has a membership account with AARP®, then by interacting with the "CONNECT TO AARP TO CLAIM" pop-up 1002, the user may be re-directed to an interface associated with the navigation system where the user may provide necessary credentials to connect his or her membership account, and thus utilize the displayed discount.

Figure 11:
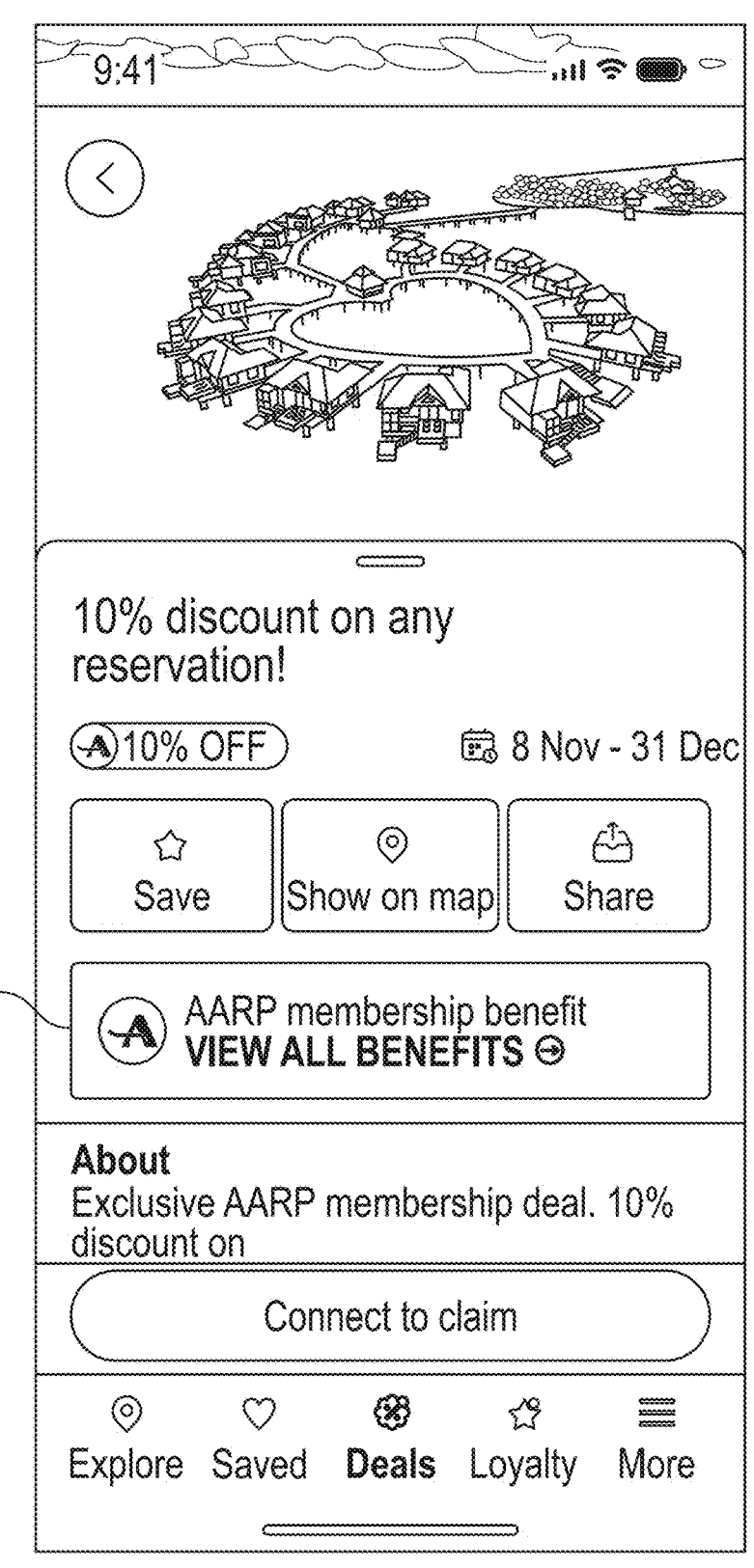
FIG. 11 schematically illustrates other exemplary membership benefits associated with a particular organization that may be displayed to a user to entice the user to join the particular organization, according to one or more aspects shown and described herein.

As another illustrative example, FIG. 11 depicts other exemplary AARP® membership benefits that may be displayed to a user to persuade the user to join AARP® and receive at least the displayed benefits. As shown, the exemplary AARP® membership benefits may be displayed to a user via an exemplary interface 1100. The AARP® membership benefits may include a special offer for a 10% discount on any hotel reservation, which is exclusively available to AARP® members. In this example, the user may not currently be an AARP® member; thus, the membership benefits may be displayed to incentivize the user to establish a membership account with AARP® and further claim the displayed benefits associated with being an AARP® member. Further, in this example, the user may interact with (e.g., click on) the "VIEW ALL BENEFITS" pop-up 1102 provided via the exemplary interface 1100 to see additional membership benefits, beyond the 10% discount on any hotel reservation, which may be available to the user should the user decide to join AARP®.

Figure 12:
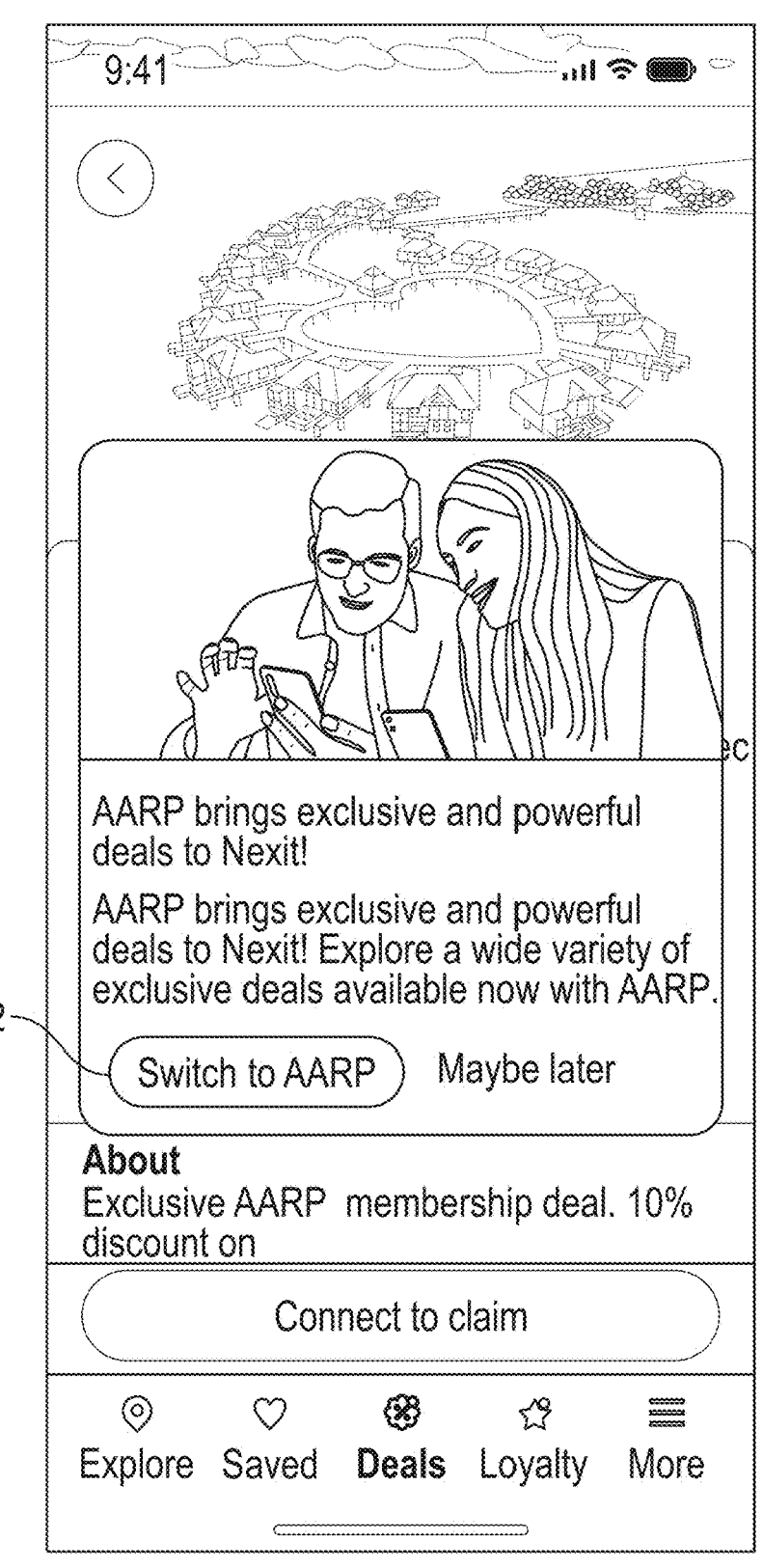
FIG. 12 schematically illustrates other exemplary membership benefits associated with a particular organization that may be displayed to a user, via an exemplary interface, at random, according to one or more aspects shown and described herein.

In some embodiments, membership benefits information may be randomly displayed to a user. For example, when using the navigation system described herein, a pop-up window, which includes membership benefits information, may be displayed to a user. In some embodiments, this pop-up window may be displayed when the navigation system is being used in a navigation mode, in a highway mode, in a city mode, in a route planning mode with trav match, and/or when the navigation system is simply running and not being used for any of the aforementioned modes. FIG. 12 depicts example membership benefits information that may be randomly displayed to a user of the navigation system. As shown in FIG. 12, the membership benefits information displayed via an exemplary interface 1200 may include information about offers and/or discounts exclusively available to AARP® members. In some cases, this membership benefits information may be displayed to incentivize the user to connect their existing AARP® account or sign up as a new member with the organization, such as to receive the marketed offers and/or discounts associated with having an active AARP® membership. In cases where the user determines to connect to their existing AARP® membership account or sign up as a new member with AARP®, the user may interact with (e.g., click on) the "Switch to AARP®" button 1202 provided via the exemplary interface 1200. Additional steps may follow to connect the user's existing AARP® membership account or set up a new membership account.

FIGS. 13A-13D illustrate an exemplary workflow 1300 for connecting a user's membership account to the navigation system. In this example, the user has an active membership with AARP®. Workflow 1300 begins by displaying a pop-up 1312 in a first exemplary interface 1302. Pop-up 1312 may ask the user whether they are currently an AARP® member. The user may interact with pop-up 1302 (e.g., click on the "Connect your account" button) to connect their account to the navigation system. Workflow 1300 then proceeds with displaying a second exemplary interface 1304. Second exemplary interface 1304 may include multiple text boxes for the user to enter their personnel information (e.g., first name, last name, email, phone number, etc.) to locate their AARP® membership account. After a user has provided the necessary information, an email may be sent to the user's provided email address. The email may comprise a unique, temporary code. Workflow 1300 then proceeds with displaying a third exemplary interface 1306. Third exemplary interface 1306 may require a user to enter the unique, temporary code that was emailed to the user, such as to verify the user's identify prior to attaching the user's AARP® membership account to the navigation system. If the code entered by the user, via third exemplary interface 1306, matches the code that was emailed to the user, then workflow 1300 proceeds with displaying a fourth exemplary interface 1308. Fourth exemplary interface 1308 may include a pop-up 1314 indicating that the attachment of the user's AARP® was successful. Based on this attachment, membership benefits exclusively for AARP® members may be displayed to the user, such that the user is able to claim and utilize one or more of these benefits when using the navigation system.

Figure 14A:
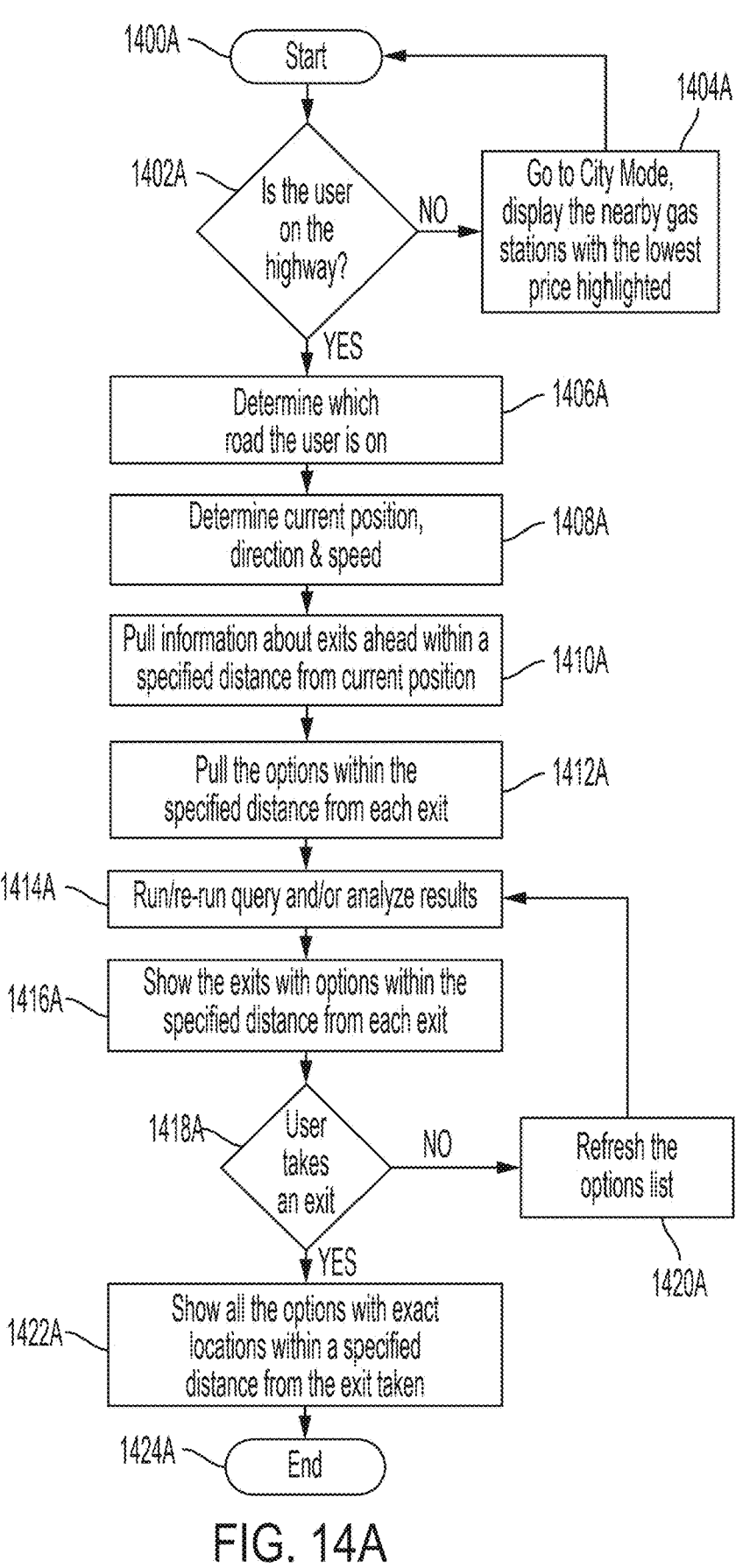
FIG. 14A is a flow chart depicting a highway mode of operation, according to one or more embodiments shown and described herein.

Referring now to FIG. 14A, a flowchart depicting a highway mode of operation is shown according to various embodiments. At block 1400A the flowchart begins and proceeds to block 1402A where a determination is made as to whether the user (via their portable client device) is travelling along on a highway. This may be determined by evaluating, for example, whether the user is travelling along a linear route, whether the route is designated as a highway, the number of cross-roads, and the like. If the user is not on a highway, then at block 1404A the interface goes into city mode and/or displays nearby gas stations with the lowest price highlighted, and then the flowchart returns to the start at block 1400A. Otherwise, if the user is on a highway, then the flowchart proceeds to block 1406A, at which point the interface determines which road the user is currently on. At block 1408A the current position, direction, and speed of the user are determined.

At block 1410A, data is received regarding a result set pertaining to exits within a specified distance (which may be user-specified or based upon the interface) of the current location. The data may be received from any suitable source, such as a remote database or server. In this embodiment, the exits are with respect to exits ahead of the user along the highway while excluding exits that the user has already passed. At block 1412A, a result subset is determined for each exit in the form of destination components and/or category components that are within a specified distance of the exit. The distance, which may be in the form of a radius, may be received from the interface or other data source, or may be user-specified. At block 1414A, the query may be re-run periodically based upon an elapsed distance travelled, time elapsed, and/or any other suitable metric. The query may also be run based upon any updates to the query. At this point, a result set and/or any result subsets pertaining to one or more exits may also be re-analyzed according to the query. At block 1416A, exits and associated result subsets of destination category icons and/or destination type icons may be displayed. At block 1418A, a determination is made as to whether or not the user has taken an exit off of the highway that has a result subset. If not, then at block 1420A the flowchart returns to block 1414A and the query may be re-run to refresh the result set (exits, result subsets, destination category icons, destination type icons, destination category components, destination type components, and the like). Otherwise, if the user has taken an exit, then at block 1422A an updated view of the exit may be displayed with more specificity regarding the result subset associated with the exit, including a closer map and/or list view of the destination category icons and the destination type icons. At block 1424A the flowchart terminates.

Figure 14B:
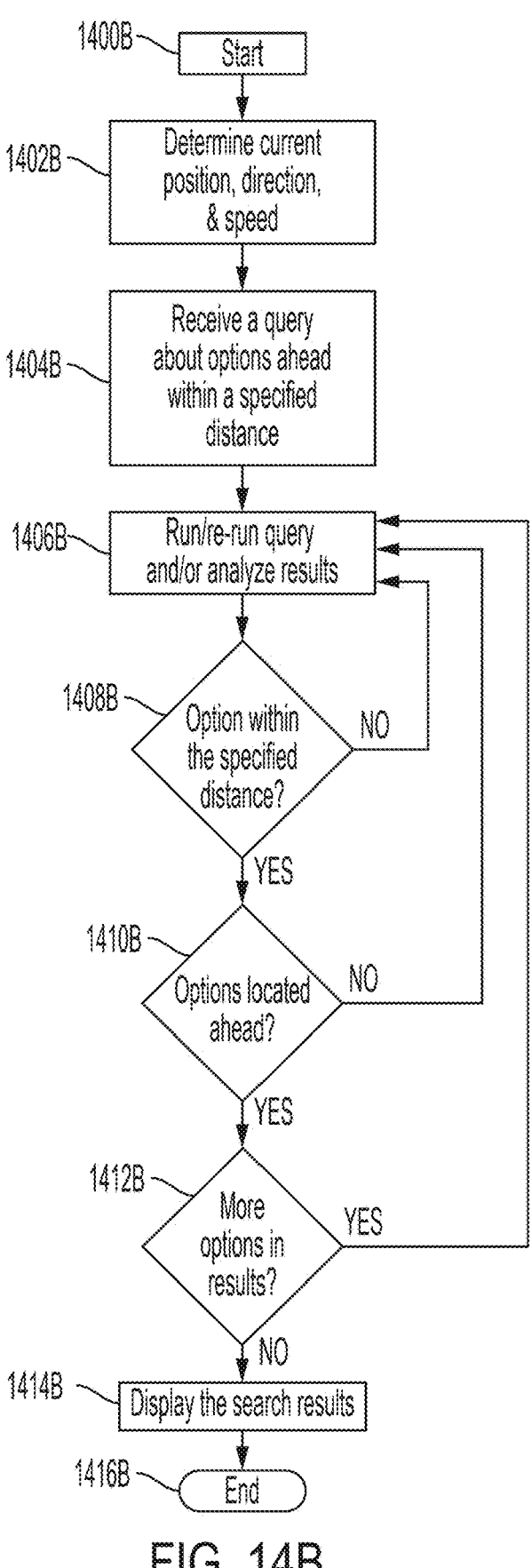
FIG. 14B is a flow chart depicting an alternate highway mode of operation, according to one or more aspects shown and described herein.

Referring now to FIG. 14B, a flowchart depicting an alternate highway mode of operation is shown according to various embodiments. At block 1400B the flowchart begins and proceeds to block 1402B where the current position, direction, and/or speed of the user (via a portable client device) travelling along a highway or other suitable road are determined by the portable client device and/or another device that receives the position, direction, and/or speed from the portable client device to make the determination. At block 1404B, a query is received from the user specifying destination category components, destination type components, a specified distance for exits ahead on the highway, and/or a specified distance for destination category components and/or destination type components from the exit. At block 1406B, the results of the query are received and analyze and/or the query is re-run based upon an elapsed distance travelled, time elapsed, and/or any other suitable metric.

At block 1408B, a determination is made as to whether any destination category components and/or destination type components are within the specified distance of the user on the highway. In this embodiment, if there is no result set (i.e., no results that match the current query), then the flowchart returns to block 1406B to re-run the query, which may be re-run immediately or after an elapsed period of time, wherein any such options may be defined by the interface and/or specified by the user. Otherwise, if there are one or more results in the result set, then the flowchart proceeds to block 1410B where a determination is made as to whether any of the results in the result set are located ahead of the user. If not, and the user has already passed all results on the highway, then no results are returned in response to the query, and the flowchart returns to block 1406B. In other embodiments, results behind the user along the highway may be returned. If more options are available in the results, then the flowchart returns to block 1406B to re-run the query. Otherwise, if there are no more options available in the result set, then at block 1414B the query results are displayed and at block 1416B the flowchart terminates.

Referring now to FIG. 15A, a flowchart depicting a determination of cheapest gas along a route is shown according to various embodiments. At block 1500A, the flowchart begins and proceeds to block 1502A where the application mode being used is determined. In some embodiments, the application mode may include a navigation mode. In some embodiments, the application mode may include a highway mode (e.g., a more specific type of navigation mode) as depicted and described above with respect to at least FIGS. 1A-3B, 14A, and/or 14B. In some embodiments, the application mode may include a city mode as depicted and described above with respect to at least FIGS. 4A-5B. In some embodiments, the application mode may include a route planning mode with trav match as depicted and described above with respect to at least FIG. 3A. In some embodiments, the application mode may be determined based on evaluating, for example, the linearity of a route of the user, whether the user's route is designated as a highway, a number of cross-roads near a location of the user, and/or the like. At block 1504A, a distance threshold is specified by the user or the interface according to the mode used, such as by way of non-limiting examples, a radius in city mode, a distance ahead on the highway, and the like. At block 1506A, a query may be executed and a search may be performed. At block 1508A, the search results may be analyzed. At block 1510A, a determination is made as to whether a result is within the threshold distance. If not, then the flowchart returns to block 1508A. Otherwise, the flowchart proceeds to block 1512A, where there is a search for subsequent results within a specified range of the current position, relative to the application mode being used. At block 1514A, gas prices for gas stations may be compared, such that a lowest gas price among the gas stations within the search results may be determined. In other embodiments, other types of prices for other types of category components may be compared. At block 1516A, the search results may be displayed in the interface, and at block 1518A the flowchart terminates.

Figure 15B:
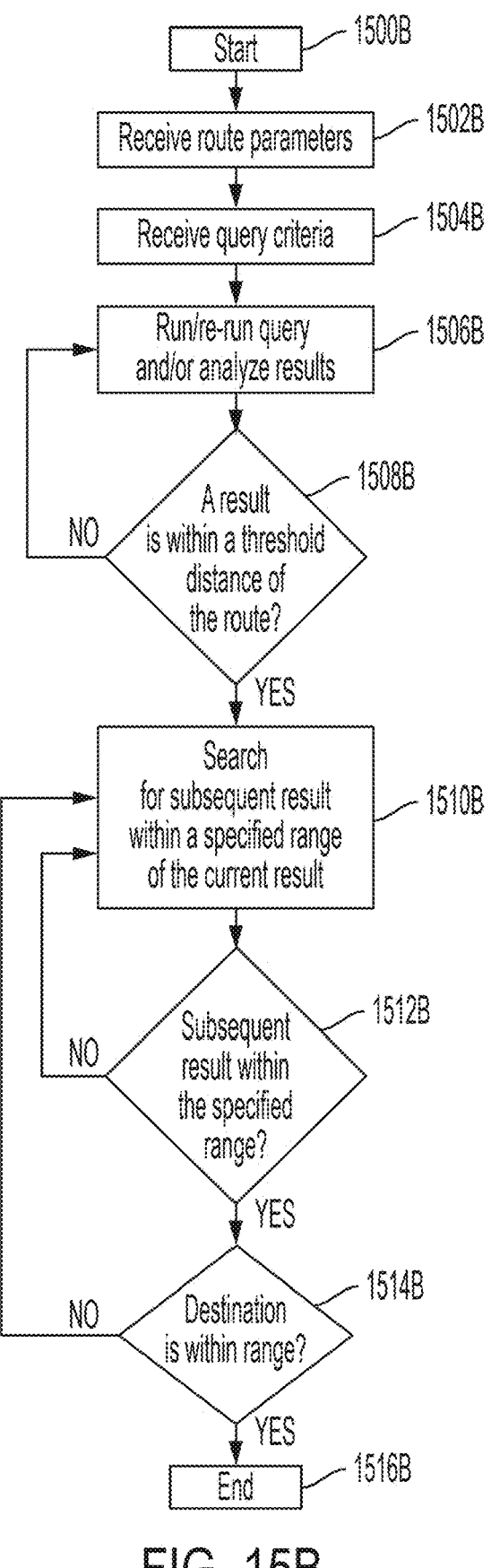
FIG. 15B is a flow chart depicting a query for chained results, according to one or more aspects shown and described herein.

Referring now to FIG. 15B, a flowchart depicting a query for chained results is shown according to various embodiments. At block 1500B the flowchart begins and proceeds to block 1502B where route parameters may be received, such as starting location, destination, distance, time requirements, a threshold amount of deviation from route, and the like. At block 1504B, query criteria may be received such as category components, destination components, price preferences/requirements, distance between results, and the like. At block 1506B, a query with the query criteria and route parameters may be run, or updated/re-run based upon passage of time, change in location, updated query criteria, and the like. At block 1508B a determination is made as to whether search results are within a threshold distance of the route. If not, then the flowchart returns to block 1506B to re-run the query. If search results are within a threshold distance of the route, then at block 1510B subsequent results may be searched within a specified range of the current results. Non-limiting examples of ranges include geographic distance from other results, distance from the route (such as a highway), expected travel time, and the like.

At block 1512B a determination is made as to whether there are subsequent results within the specified range. If not, then the flowchart returns to search for additional subsequent results within the specified range at block 1510B. If there are no subsequent results within the specified range, then at block 1514B a determination is made as to whether a destination is within the specified range. If not, then the flowchart returns to block 1510B where subsequent results may be searched within the specified range of the current results. Otherwise, if there are subsequent results within the specified range, then the flowchart terminates at block 1516B.

Figure 16A:
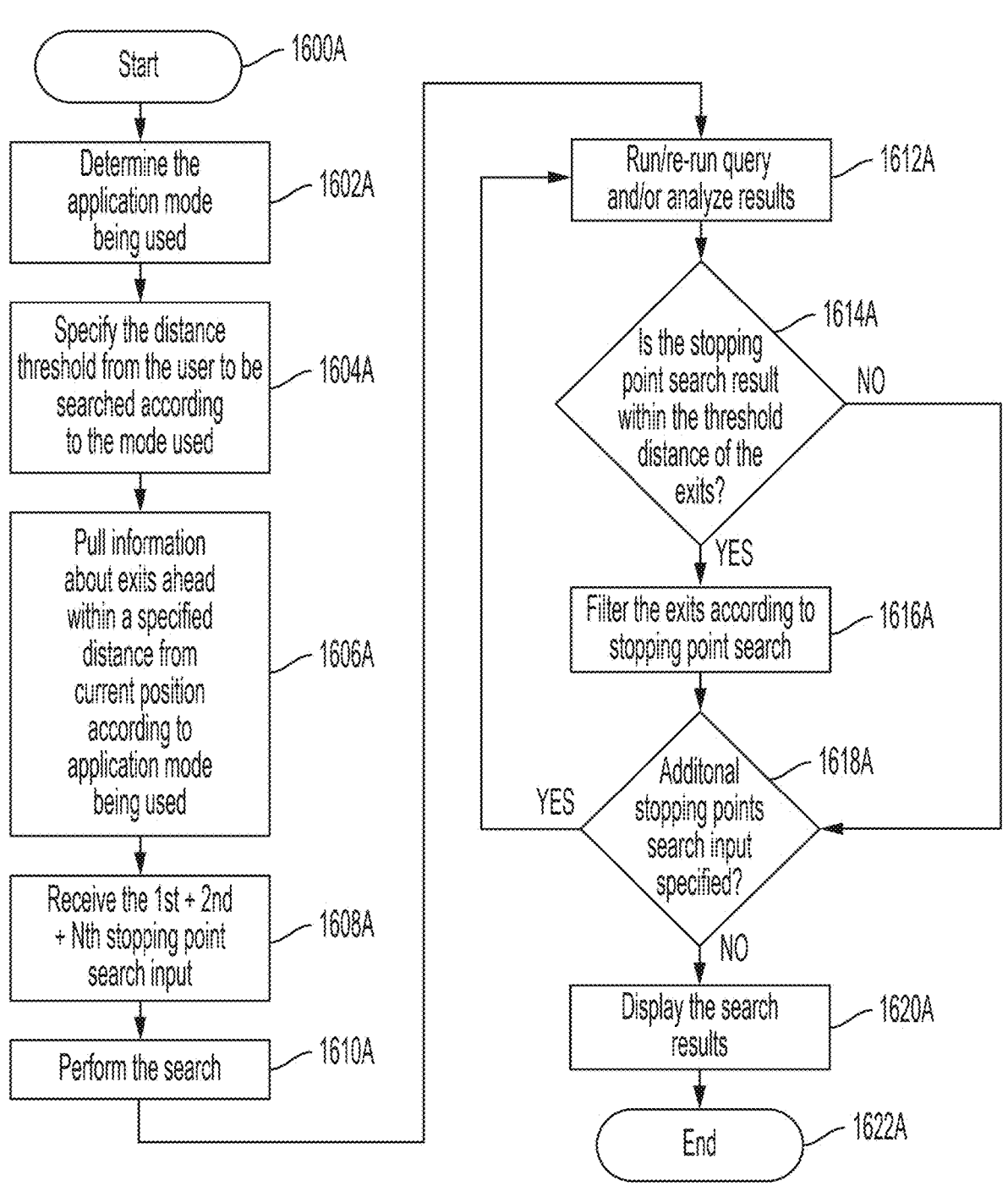
FIG. 16A is a flow chart depicting a multi-criteria query utilizing clustered results, according to one or more aspects shown and described herein.

Referring now to FIG. 16A, a flowchart depicting a multi-criteria query utilizing clustered results is shown according to various embodiments. At block 1600A, the flowchart begins and proceeds to block 1602A where the application mode (e.g., a navigation mode, a highway mode, a city mode, a route planning mode with trav match, and/or the like) being used is determined. This may be determined by evaluating, for example, the linearity of the route, whether the route is designated as a highway, the number of cross-roads, and the like. At block 1604A, a distance threshold is specified by the user or the interface according to the mode used, such as by way of non-limiting examples, a radius in city mode, a distance ahead on the highway, and the like. At block 1606A, information may be received about highway exits or other stopping points within a specified distance from the user's current position according to the application mode being used. At block 1608A, one or more stopping points ($1^{st}$, $2^{nd}$, $N^{th}$) may be set based upon category components and/or destination components received from the user. In some embodiments, the user may specify one or more stopping points not related to a category component or a destination component, but rather a specific location. At block 1610A, the search with the stopping points may be performed. At block 1612A, the query may be run or re-run and the results may be analyzed or re-analyzed.

At block 1614A, a determination is made as to whether a stopping point search result is within the specified distance threshold, such as within a threshold distance of a highway exit. If the stopping point search result is within the specified distance threshold, then at block 1616A the results are filtered according to the stopping point (such as a highway exit) and the flowchart then proceeds to block 1618A. If not, then the flowchart proceeds from block 1614A directly to block 1618A where a determination is made as to whether there are additional stopping points specified as search inputs. If so, then the flowchart returns to block 1612A. If not, then the search results are displayed at block 1620A, and the flowchart terminates at block 1622A.

Figure 16B:
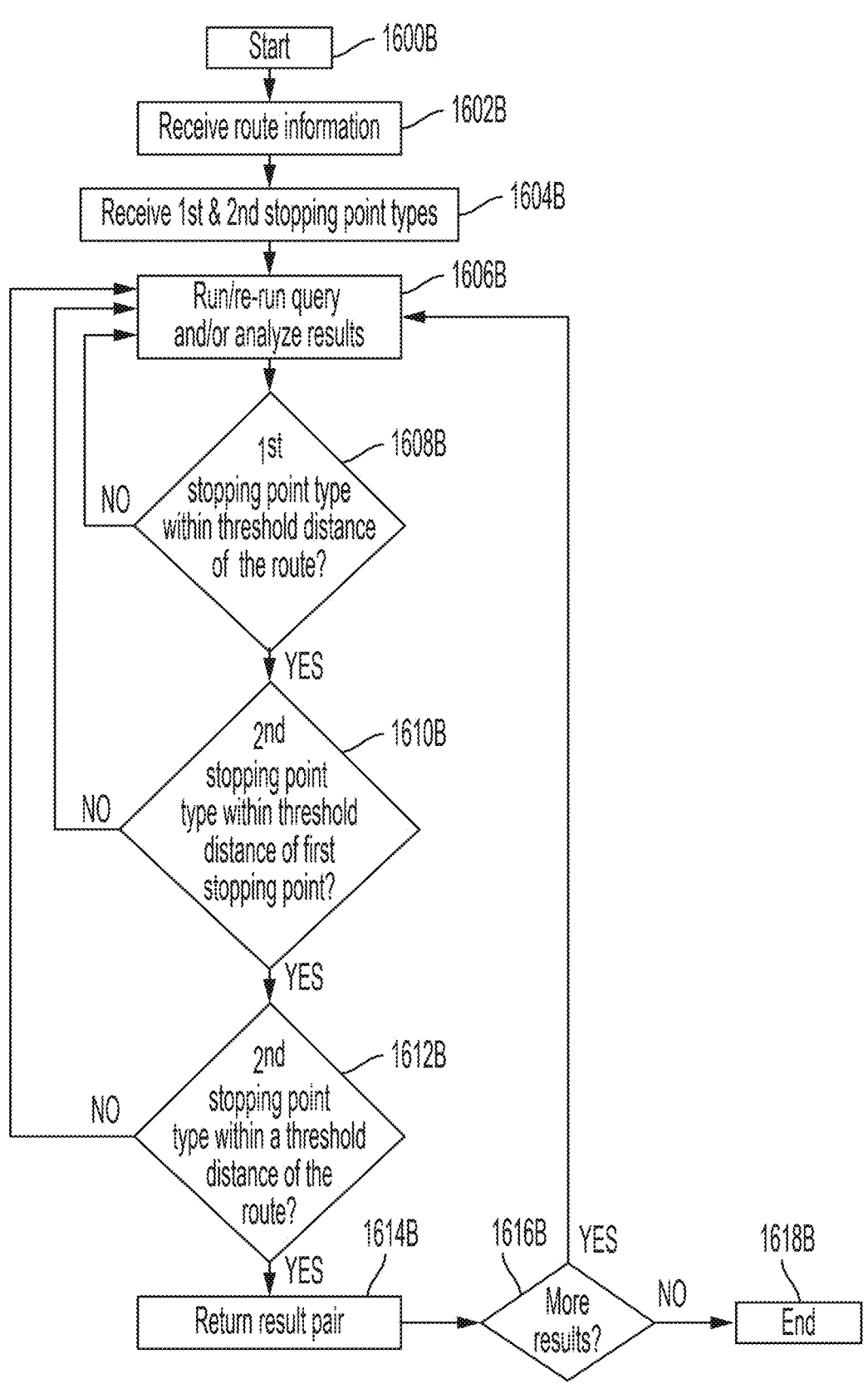
FIG. 16B is a flow chart depicting an alternate multi-criteria query utilizing clustered results, according to one or more aspects shown and described herein.

Referring now to FIG. 16B, a flowchart depicting an alternate multi-criteria query utilizing clustered results is shown according to various embodiments. At block 1600B the flowchart begins and proceeds to block 1602B where route information is received from the user, such as a destination point, route selection, and the like. At block 1604B, first and second stopping point types are received. In some embodiments, a stopping point type may correspond to a destination category icon, a destination type icon, a category component, a destination component, and the like.

By way of non-limiting example, stopping point types may be a gas station and a restaurant, where the user wants to find both at the same highway exit. At block 1606B, a query is run (or re-run if previously run) and/or the results are analyzed.

At block 1608B, a determination is made as to whether the first stopping point type is within a threshold distance of the route. For example, this could be a determination of whether a gas station is within a mile of the highway. If not, then the flowchart returns to block 1606B. If the first stopping point type is within a threshold distance of the route, then at block 1610B a determination is made as to whether a second stopping point type is within a threshold distance of the first stopping point. For example, this could be a determination of whether a restaurant is within half a mile of the gas station. If not, then the flowchart returns to block 1606B. If the second stopping point type is within a threshold distance of the first stopping point, then at block 1612B a determination is made as to whether the second stopping point is within a threshold distance of the route. For example, this could be a determination of whether the restaurant is within two miles of the gas station so that the user does not wander too far from the route. If not, then the flowchart returns to block 1606B. If the second stopping point is within a threshold distance of the route, then at block 1614B the first stopping point type and the second stopping point type may be returned as a result pair. At block 1616B, a determination is made as to whether there are more results. If so, then the flowchart returns to block 1606B. Otherwise, if there are no more results at block 1616B, then the flowchart proceeds to block 1618B and terminates.

In another embodiment, the current location is moving along a travel route, the second threshold distance is a distance between a common location and each of the requested destination types within the result subset, and the common location is ahead of the current location along the travel route. There may be a plurality of result subsets, wherein each result subset corresponds to a different common location ahead of the current location along the travel route. For each of a plurality of common locations ahead of the current location along the travel route, it may be determined whether each of the requested destination types are within the second threshold distance of the common location. For each common location, an indication may be returned of each of the requested destination types accompanying each of the one or more common locations, wherein each of the plurality of the requested destination types belong to at least one of a plurality of destination categories. The destination categories may each comprise a plurality of destination types. An indication of the destination category or the different destination type may be provided based upon a requested destination type not being within the second threshold distance of a common location and a different destination type within a same destination category being within the second threshold distance of the same common location. Each of the plurality of the requested destination types may belong to one of a plurality of destination categories and each of the destination categories comprise a plurality of destination types, which may include associating a value with each destination type that is within (i) a requested destination category and (ii) a specified distance of a common location ahead of the current location along the travel route, and returning a specified top-N quantity of the selected destination types based upon a sorting of the associated values.

Figure 17:
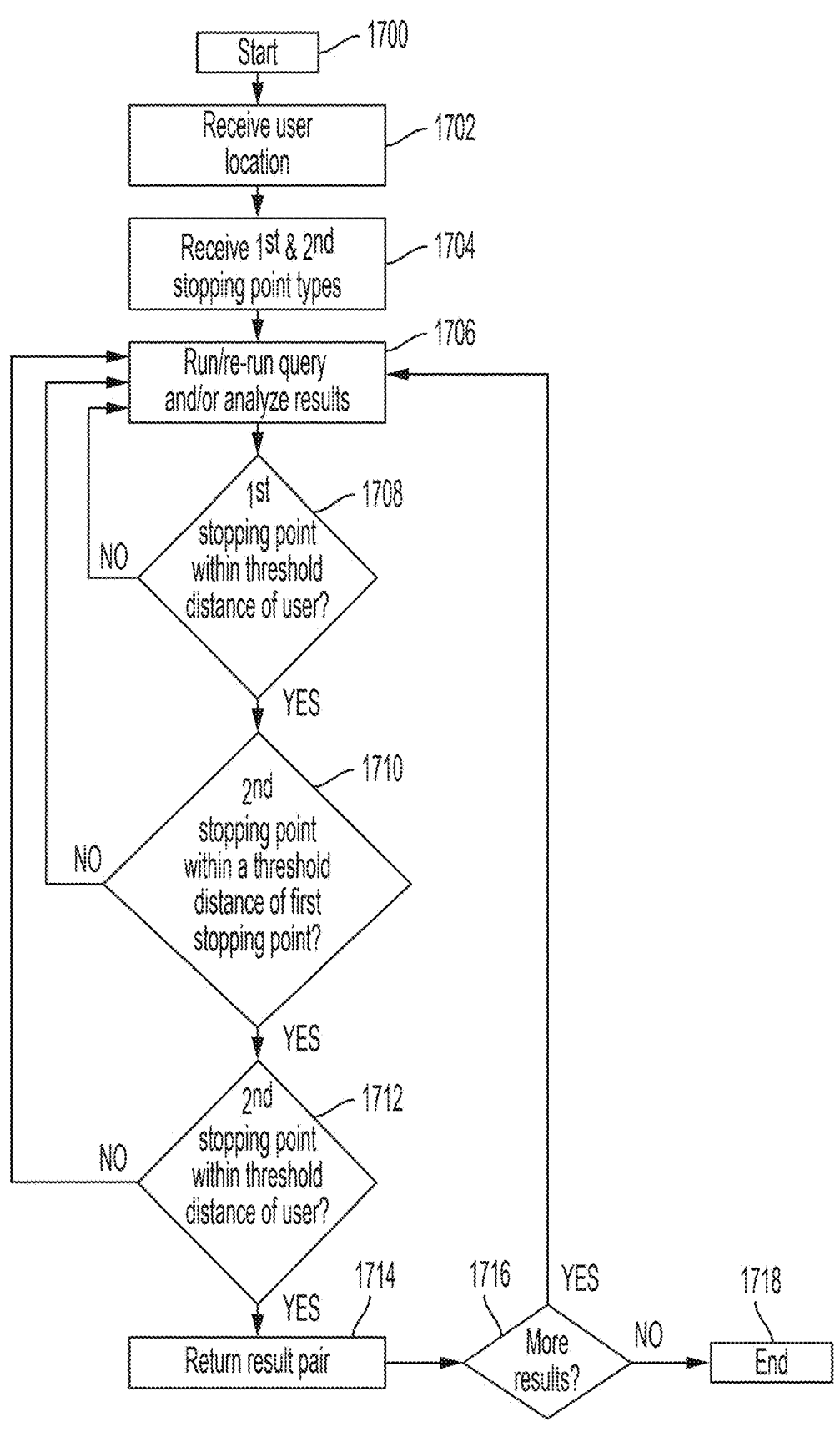
FIG. 17 is a flow chart depicting a multi-criteria query utilized within a city, according to one or more aspects shown and described herein.

Referring now to FIG. 17, a flowchart depicting a multi-criteria query utilized within a city is shown according to various embodiments. At block 1700 the flowchart begins and proceeds to block 1702 where a user location is received from the user's client device or other devices in communication with the user's client device. At block 1704, first and second stopping point types are received. In some embodiments, a stopping point type may correspond to a destination category icon, a destination type icon, a category component, a destination component, and the like. By way of non-limiting example, stopping point types may be a gas station and a restaurant, where the user wants to find both at the same highway exit. At block 1706, a query is run (or re-run if previously run) and/or the results are analyzed.

At block 178, a determination is made as to whether the first stopping point type is within a threshold distance of the user. For example, this could be a determination of whether a pharmacy is within a mile of the user. If not, then the flowchart returns to block 176. If the first stopping point type is within a threshold distance of the user, then at block 1710 a determination is made as to whether a second stopping point type is within a threshold distance of the first stopping point. For example, this could be a determination of whether a restaurant is within half a mile of the pharmacy. If not, then the flowchart returns to block 176. If the second stopping point type is within a threshold distance of the first stopping point, then at block 1712 a determination is made as to whether the second stopping point is within a threshold distance of the user. For example, this could be a determination of whether the restaurant is within two miles of the user so they do not travel too far to reach multiple stopping points. If not, then the flowchart returns to block 176. If the restaurant is within two miles of the user, then at block 1714 the first stopping point type and the second stopping point type may be returned as a result pair. At block 1716, a determination is made as to whether there are more results. If so, then the flowchart returns to block 1718. Otherwise, if there are no more results at block 1716, then the flowchart proceeds to block 1718 and terminates.

Figure 18:
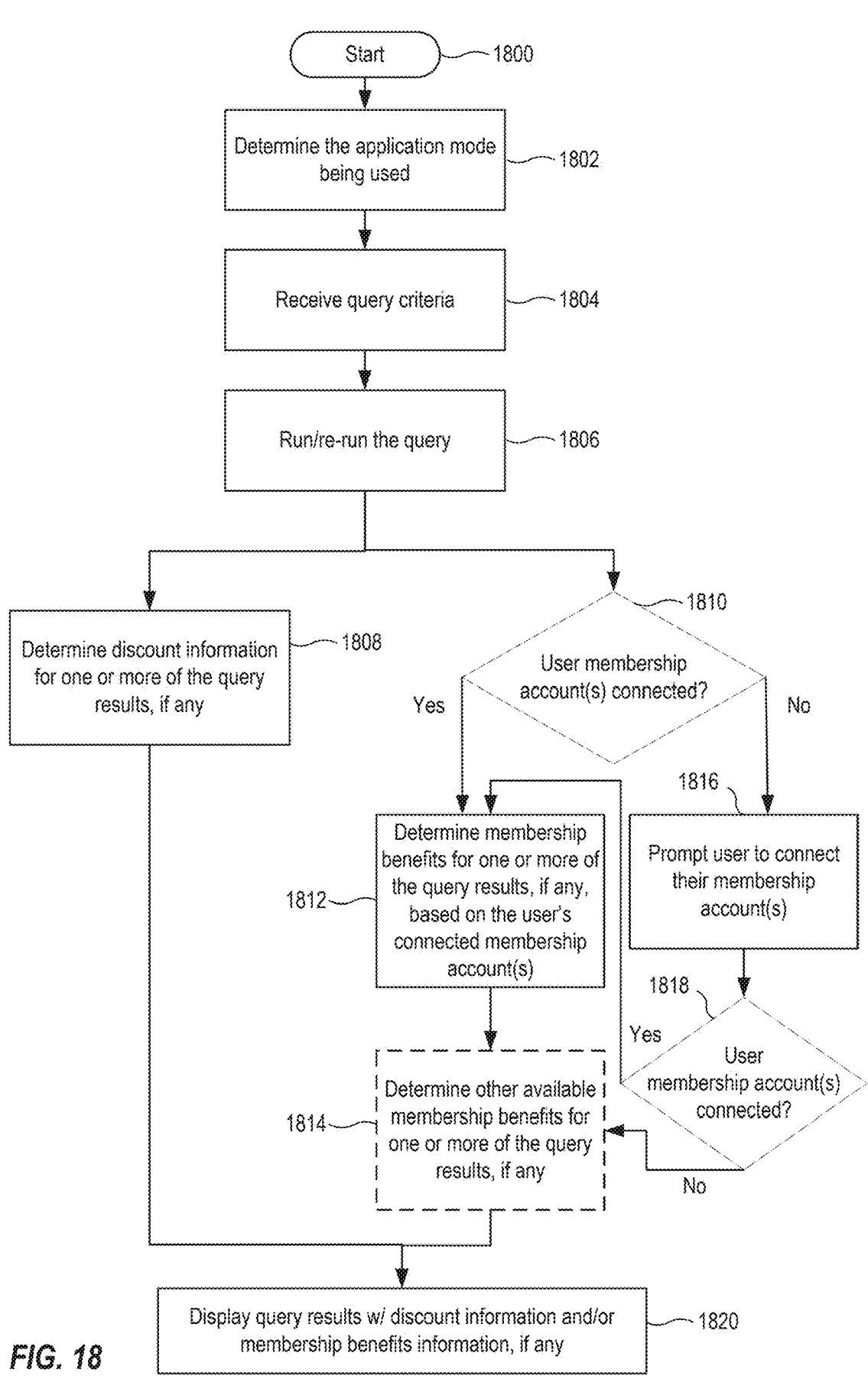
FIG. 18 is a flow chart depicting a method of determining discounts and/or membership benefits for one or more query results, according to one or more aspects shown and described herein.

Referring now to FIG. 18, a flowchart depicting a determination of discounts and/or membership benefits for one or more query results is shown according to various aspects. At block 1800, the flowchart begins and proceeds, to block 1802, with determining the application mode (e.g., a navigation mode, a highway mode, a city mode, a route planning mode with trav match, and/or the like). In some aspects, the application mode may be determined based on evaluating, for example, whether the linearity of a route of the user, whether the user's route is designated as a highway, a number of cross-roads near a location of the user, and/or the like.

At block 1804, query criteria, such as category components, destination components, price preferences/requirements, distance between results, a distance threshold (e.g., a radius in city mode, a distance ahead on the highway, and/or the like) may be received. In some embodiments, the user may provide the query criteria.

At block 1806, a query may be executed and a search may be performed. One or more query results may be returned based on executing the query. The query results may include one or more locations that correspond to the requested category components, the requested destination components, and/or the price preferences/requirements, one or more locations that satisfy the specified distance between results, one or more locations that satisfy the distance threshold, and/or the like.

In some embodiments, discount information corresponding to one or more of the query results may be determined. Thus, the flowchart proceeds, at block 1808, with determining this discount information. In some embodiments, discount information may be available for at least one of the query results. In some embodiments, no discount information may be available for any of the query results. The discount information may include discounts, special offers, price reductions, and/or the like provided by one or more retailers. In some embodiments, at least one of the retailers may currently provide service(s) to the user (e.g., AT&T® may be a service provider (e.g., of cellular service, internet service, etc.) of the user). In some embodiments, at least one of the retailers may not currently provide service(s) to the user (e.g., AT&T® may not be a service provider of the user).

In some embodiments, membership benefits information corresponding to one or more of the query results may be determined. Thus, the flowchart proceeds, at block 1810, with determining whether the user has connected any membership account(s) (e.g., connected to the navigation system, such as via workflow 1300 depicted and described above with respect to FIGS. 13A-13D).

In some embodiments, the user has connected at least one membership account (e.g., connected their AARP® membership account). Thus, the flowchart may proceed, at block 1812, with determining membership benefits for one or more of the query results based on the user's connected membership. In some embodiments, one or more benefits, offered by the organization(s) associated with the connected membership account(s), may be available for at least one of the query results. In some embodiments, no benefits, offered by the organization(s) associated with the connected membership account(s), may be available for any of the query results.

Optionally, at block 1814, the flowchart proceeds with determining whether there are other membership benefits available that correspond to one or more of the query results. The other membership benefits may include benefits that are offered by one or more organizations, for which the user is not a member (e.g., the user may not have a Choice Privileges® membership, but membership benefits associated with being a Choice Privileges® member may be determined at block 1814).

In some other embodiments, the user has not connected any membership accounts (e.g., connected their AARP® membership account). Thus, from block 1810, the flowchart may proceed, at block 1816, with prompting a user to connect their existing membership account(s). For example, the user may follow the steps depicted in workflow 1300 of FIGS. 13A-13D to connect one or more membership accounts to the navigation system.

At block 1818, the flowchart proceeds with again determining whether the user has connected any membership account(s). In some embodiments, the user has connected at least one membership account (e.g., connected their AARP® membership account at block 1816). Thus, the flowchart proceeds, at block 1812, with determining membership benefits for one or more of the query results based on the user's connected membership. Optionally, at block 1814, the flowchart may then proceed with determining whether there are other membership benefits available that correspond to one or more of the query results.

In some other embodiments, the user has not connected any membership accounts (e.g., the user did not connect their AARP® membership account at block 1816). Thus, from block 1818, the flowchart proceeds, at block 1814, with determining whether there are other membership benefits available that correspond to one or more of the query results.

The flowchart then proceeds, at block 1820, with displaying the query results, along with the discount information (e.g., determined at block 1808) and/or the membership benefits information (e.g., determined at blocks 1812 and/or 1814). Exemplary discount information and membership benefits information displayed at block 1820 is depicted and described above with respect to FIGS. 6A-6C, 7, 8, 9A-9C, 10, 11, and 12.

Figure 19:
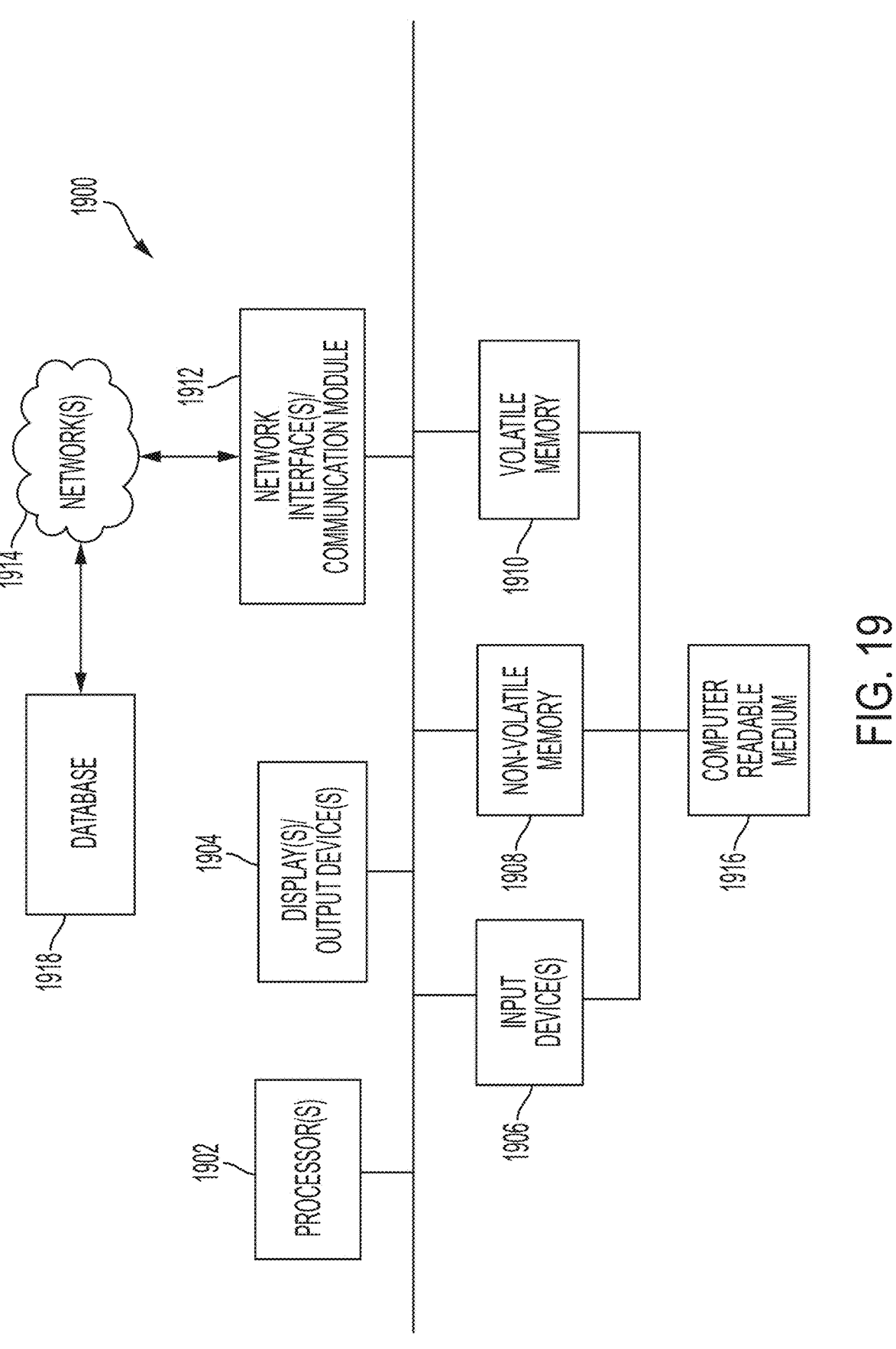
FIG. 19 is a block diagram illustrating computing hardware utilized in one or more devices, according one or more embodiments shown and described herein.

Referring now to FIG. 19, a block diagram illustrates an exemplary computing device 1900, through which embodiments of the disclosure can be implemented. The computing device 1900 described herein is but one example of a suitable computing device and does not suggest any limitation on the scope of any embodiments presented. The computing device 1900 in some embodiments may also be utilized to implement a synchronizing sensor and/or a recorder. Nothing illustrated or described with respect to the computing device 1900 should be interpreted as being required or as creating any type of dependency with respect to any element or plurality of elements. In various embodiments, a computing device 1900 may include, but need not be limited to, a desktop, laptop, server, client, tablet, smartphone, or any other type of device that can compress data. In an embodiment, the computing device 1900 includes at least one processor 1902 and memory (non-volatile memory 1008 and/or volatile memory 1910). The computing device 1900 can include one or more displays and/or output devices 1904 such as monitors, speakers, headphones, projectors, wearable-displays, holographic displays, and/or printers, for example. Output devices 1904 may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The computing device 1900 may further include one or more input devices 196 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 196 may further include sensors, such as biometric (blood pressure, pulse, heart rate, perspiration, temperature, voice, facial-recognition, iris or other types of eye recognition, hand geometry, fingerprint, DNA, dental records, weight, or any other suitable type of biometric data, etc.), video/still images, motion data (accelerometer, GPS, magnetometer, gyroscope, etc.) and audio (including ultrasonic sound waves). Input devices 196 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like.

The computing device 1900 typically includes non-volatile memory 198 (ROM, flash memory, etc.), volatile memory 1910 (RAM, etc.), or a combination thereof. A network interface 1912 can facilitate communications over a network 1914 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1912 can be communicatively coupled to any device capable of transmitting and/or receiving data via the network 1914. Accordingly, the network interface hardware 1912 can include a communication transceiver for sending and/or receiving any wired or wireless communication. For example, the network interface hardware 1912 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 1916 may comprise a plurality of computer readable mediums, each of which may be either a computer readable storage medium or a computer readable signal medium. A computer readable medium 1916 may reside, for example, within an input device 196, non-volatile memory 198, volatile memory 1910, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1900 may include one or more network interfaces 1912 to facilitate communication with one or more remote devices, which may include, for example, client and/or server devices. A network interface 1912 may also be described as a communications module, as these terms may be used interchangeably. A database 1918 may be remotely accessible on a server or other distributed device and/or stored locally in the computing device 1900.

Figure 20:
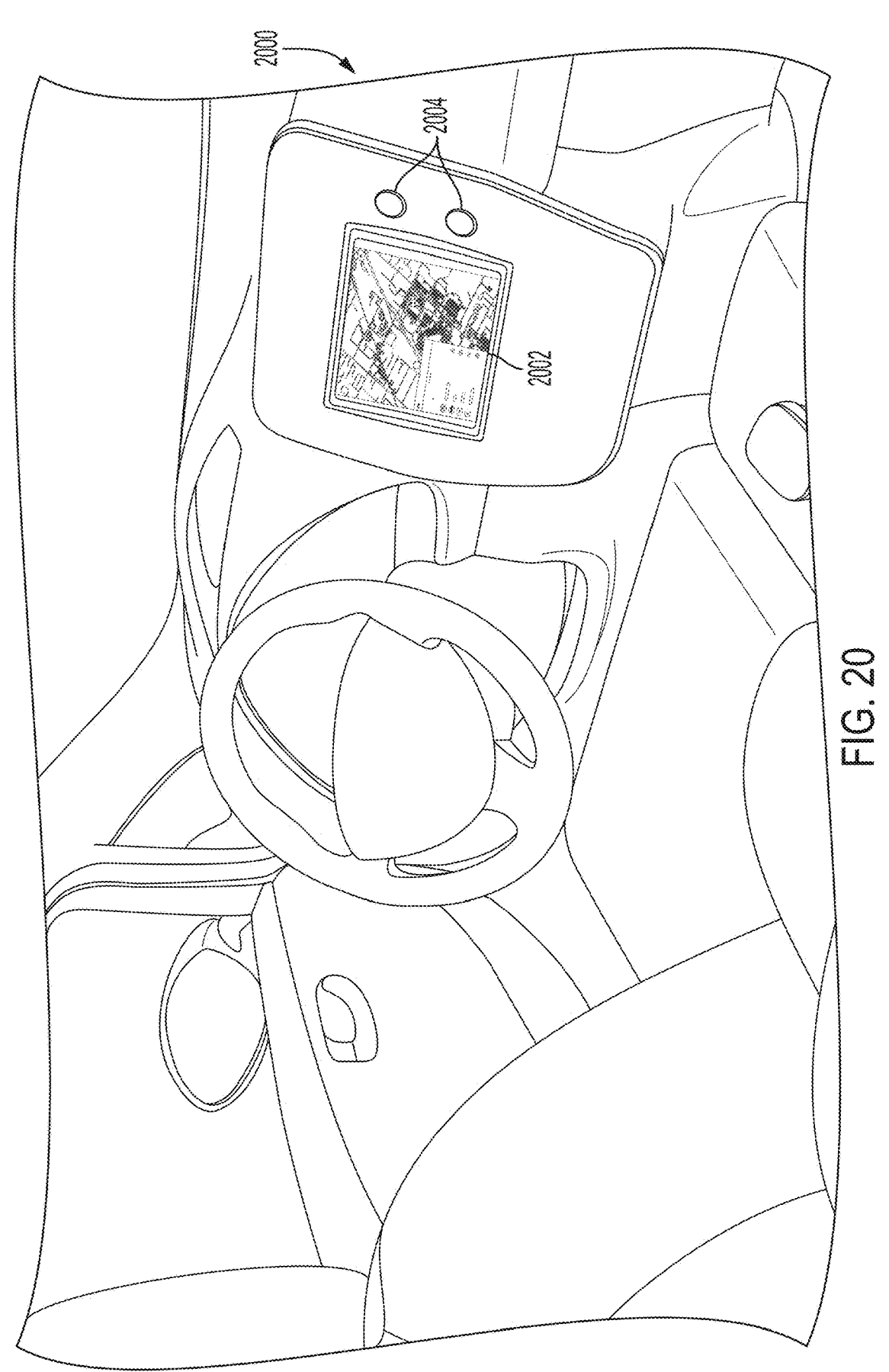
FIG. 20 schematically illustrates an in-vehicle system interface, according one or more embodiments shown and described herein.

Referring now to FIG. 20, a vehicle 2000 is depicted with a console 2002, through which embodiments of the disclosure can be implemented. In this embodiment, a vehicle 2000 may include a console 2002 and display inputs 2004. Any suitable type of console 2002 may be utilized, such as a touch screen, or any other suitable type of display, such as discussed above with respect to 1904 of FIG. 19. Any suitable type of display inputs 2004 may be utilized, such as buttons, knobs, on-screen inputs such as buttons, and/or those example display inputs discussed above with respect to 1906 of FIG. 19. In some embodiments, a voice control option may be available to allow a user to operate the embodiments herein via voice command.

Example Method for Enhanced Navigation

FIG. 21 depicts an example method 2100 for enhanced navigation. In one aspect, method 2100 can be implemented by the computing device 1900 of FIG. 19.

Method 2100 begins, at block 2102, with determining a current location based upon received location data.

Method 2100 proceeds, at block 2104, with determining a travel route from the current location to a specified destination location.

Method 2100 proceeds, at block 2106, with receiving a query, from a user interface, requesting a plurality of requested destination types along the travel route. Each of the plurality of requested destination types may belong to at least one of a plurality of destination categories. Each of the destination categories comprises two or more of the plurality of requested destination types.

Method 2100 proceeds, at block 2108, with determining a result set comprising a plurality of locations corresponding to the plurality of requested destination types along the travel route.

Method 2100 proceeds, at block 2110, with determining at least one of discount information or membership benefits information associated with at least one location of the plurality of locations in the result set.

Method 2100 proceeds, at block 2112, with displaying, via the user interface and in response to the received query, a plurality of result subsets and at least one of the discount information or the membership benefits information. Each result subset of the plurality of result subsets may comprise a subset of the plurality of requested destination types in the result set based upon a threshold distance. The threshold distance associated with each result subset is a distance between: each of the requested destination types within the respective result subset; or a common location and each of the requested destination types within the respective result subset. Further, at least one result subset of the plurality of result subsets may comprise another destination type within a same destination category as a requested destination type from the plurality of requested destination types based at least in part on the requested destination type not being within the threshold distance associated with the at least one result subset, the other destination type being within the threshold distance associated with the at least one result subset.

Method 2100 proceeds, at block 2114, with updating the current location, the result set, the plurality of result subsets, and at least one of the discount information or the membership benefits information based upon receiving updated location data.

In some aspects, displaying at least one of the discount information or the membership benefits information comprises displaying, via the user interface, one or more pop-ups comprising at least one of the discount information or the membership benefits information.

In some aspects, determining at least one of the discount information or the membership benefits information comprises determining the membership benefits information, and the membership benefits information comprises at least one of: an indication of a first set of membership benefits associated with a connected membership account; or an indication of a second set of membership benefits not associated with any connected membership account.

In some aspects, displaying at least one of the discount information or the membership benefits information comprises displaying the membership benefits information, the membership benefits information comprises an indication of a set of membership benefits not associated with any connected membership account, and method 2100 further comprises: prompting a user to at least one of: connect an existing membership account that is associated with the set of membership benefits; or establish and connect a new membership account that is associated with the set of membership benefits.

In some aspects, method 2100 further comprises: identifying a connected membership account; and displaying, via the user interface, a plurality of membership benefits available and associated with the connected membership account.

In some aspects, determining at least one of the discount information or the membership benefits information comprises determining the discount information, and the discount information comprises at least one of: an indication of a first set of discounts associated with a first retailer; or an indication of a second set of discounts associated with a second retailer.

In some aspects, displaying at least one of the discount information or the membership benefits information comprises displaying the discount information, the discount information comprises an indication of a set of discounts associated with a first retailer, and method 2100 further comprises: determining a user is utilizing one or more services provided by a second retailer instead of the first retailer; and prompting the user to switch from utilizing the one or more services provided by the first retailer.

In some aspects, the current location is moving along the travel route; the threshold distance associated with each result subset is the distance between the common location and each of the requested destination types within the respective result subset; and each common location is ahead of the current location along the travel route.

In some aspects, each result subset of the plurality of result subsets corresponds to a different common location ahead of the current location along the travel route.

In some aspects, method 2100 further comprises: determining, for each of a plurality of common locations ahead of the current location along the travel route, whether each of the requested destination types are within the threshold distance of the common location; and returning, for each common location, an indication of each of the requested destination types accompanying each of the one or more common locations.

In some aspects, method 2100 further comprises: associating a value with each of the plurality of destination types that is within (i) a requested destination category of the plurality of destination categories and (ii) a specified distance of a common location ahead of the current location along the travel route; and returning a specified top-N quantity of the plurality of destination types based upon a sorting of the associated values.

In some aspects, method 2100 further comprises: determining the current location is located on a highway, wherein determining the travel route from the current location to the specified destination location occurs in response to determining the current location is located on the highway.

In some aspects, method 2100 further comprises: associating a value with each of the plurality of destination types that is within (i) a requested destination category of the plurality of destination categories and (ii) a specified distance of a common location ahead of the current location along the travel route; and displaying each of the plurality of destination types and the value associated with each of the plurality of destination types.

Note that FIG. 21 is just one example of a method, and other methods including fewer, additional, or alternative operations are possible consistent with this disclosure.

ADDITIONAL CONSIDERATIONS

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

determining a current location based upon received location data;

determining a travel route from the current location to a specified destination location;

receiving a query, from a user interface, requesting a plurality of requested destination types along the travel route, wherein:

each of the plurality of requested destination types belongs to at least one of a plurality of destination categories; and each of the destination categories comprises two or more of the plurality of requested destination types;

determining a result set comprising a plurality of locations corresponding to the plurality of requested destination types along the travel route;

determining at least one of discount information or membership benefits information associated with at least one location of the plurality of locations in the result set;

displaying, via the user interface and in response to the received query, a plurality of result subsets and at least one of the discount information or the membership benefits information, wherein:

each result subset of the plurality of result subsets comprises a subset of the plurality of requested destination types in the result set based upon a threshold distance, the threshold distance associated with each result subset is a distance between:

each of the requested destination types within the respective result subset; or a common location and each of the requested destination types within the respective result subset, and at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and updating the current location, the result set, the plurality of result subsets, and at least one of the discount information or the membership benefits information based upon receiving updated location data.

2. The method of claim 1, wherein displaying at least one of the discount information or the membership benefits information comprises displaying, via the user interface, one or more pop-ups comprising at least one of the discount information or the membership benefits information.

3. The method of claim 1, wherein:

determining at least one of the discount information or the membership benefits information comprises determining the membership benefits information, and the membership benefits information comprises at least one of:

an indication of a first set of membership benefits associated with a connected membership account; or an indication of a second set of membership benefits not associated with any connected membership account.

4. The method of claim 1, wherein:

displaying at least one of the discount information or the membership benefits information comprises displaying the membership benefits information, the membership benefits information comprises an indication of a set of membership benefits not associated with any connected membership account, and the method further comprises:

prompting a user to at least one of:

connect an existing membership account that is associated with the set of membership benefits; or establish and connect a new membership account that is associated with the set of membership benefits.

5. The method of claim 1, further comprising:

identifying a connected membership account; and displaying, via the user interface, a plurality of membership benefits available and associated with the connected membership account.

6. The method of claim 1, wherein:

determining at least one of the discount information or the membership benefits information comprises determining the discount information, and the discount information comprises at least one of:

an indication of a first set of discounts associated with a first retailer; or an indication of a second set of discounts associated with a second retailer.

7. The method of claim 1, wherein:

displaying at least one of the discount information or the membership benefits information comprises displaying the discount information, the discount information comprises an indication of a set of discounts associated with a first retailer, and the method further comprises:

determining a user is utilizing one or more services provided by a second retailer instead of the first retailer; and prompting the user to switch from utilizing the one or more services provided by the first retailer.

8. The method of claim 1, wherein:

the current location is moving along the travel route;

the threshold distance associated with each result subset is the distance between the common location and each of the requested destination types within the respective result subset; and each common location is ahead of the current location along the travel route.

9. The method of claim 8, wherein each result subset of the plurality of result subsets corresponds to a different common location ahead of the current location along the travel route.

10. The method of claim 9, further comprising:

determining, for each of a plurality of common locations ahead of the current location along the travel route, whether each of the requested destination types are within the threshold distance of the common location; and returning, for each common location, an indication of each of the requested destination types accompanying each of the one or more common locations.

11. The method of claim 1, further comprising:

associating a value with each of the plurality of destination types that is within (i) a requested destination category of the plurality of destination categories and (ii) a specified distance of a common location ahead of the current location along the travel route; and returning a specified top-N quantity of the plurality of destination types based upon a sorting of the associated values.

12. The method of claim 1, further comprising:

determining the current location is located on a highway, wherein determining the travel route from the current location to the specified destination location occurs in response to determining the current location is located on the highway.

13. The method of claim 1, further comprising:

associating a value with each of the plurality of destination types that is within (i) a requested destination category of the plurality of destination categories and (ii) a specified distance of a common location ahead of the current location along the travel route; and displaying each of the plurality of destination types and the value associated with each of the plurality of destination types.

14. A system comprising:

a memory; and a processor coupled to the memory, wherein the processor is configured to cause the system to:

determine a current location based upon received location data;

determine a travel route from the current location to a specified destination location;

receive a query, from a user interface, requesting a plurality of requested destination types along the travel route, wherein:

each of the plurality of requested destination types belongs to at least one of a plurality of destination categories; and each of the destination categories comprises two or more of the plurality of requested destination types;

determine a result set comprising a plurality of locations corresponding to the plurality of requested destination types along the travel route;

determine at least one of discount information or membership benefits information associated with at least one location of the plurality of locations in the result set;

display, via the user interface and in response to the received query, a plurality of result subsets and at least one of the discount information or the membership benefits information, wherein:

each result subset of the plurality of result subsets comprises a subset of the plurality of requested destination types in the result set based upon a threshold distance, the threshold distance associated with each result subset is a distance between:

each of the requested destination types within the respective result subset; or a common location and each of the requested destination types within the respective result subset, and at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and update the current location, the result set, the plurality of result subsets, and at least one of the discount information or the membership benefits information based upon receiving updated location data.

15. The system of claim 14, wherein to display at least one of the discount information or the membership benefits information, the processor is configured to cause the system to display, via the user interface, one or more pop-ups comprising at least one of the discount information or the membership benefits information.

16. The system of claim 14, wherein:

to determine at least one of the discount information or the membership benefits information, the processor is configured to cause the system to determine the membership benefits information, and the membership benefits information comprises at least one of:

an indication of a first set of membership benefits associated with a connected membership account; or an indication of a second set of membership benefits not associated with any connected membership account.

17. The system of claim 14, wherein:

to display at least one of the discount information or the membership benefits information, the processor is configured to cause the system to display the membership benefits information, the membership benefits information comprises an indication of a set of membership benefits not associated with any connected membership account, and the processor is configured to cause the system to:

prompt a user to at least one of:

connect an existing membership account that is associated with the set of membership benefits; or establish and connect a new membership account that is associated with the set of membership benefits.

18. The system of claim 14, wherein the processor is configured to cause the system to:

identify a connected membership account; and display, via the user interface, a plurality of membership benefits available and associated with the connected membership account.

19. The system of claim 14, wherein:

to determine at least one of the discount information or the membership benefits information, the processor is configured to cause the system to determine the discount information, and the discount information comprises at least one of:

an indication of a first set of discounts associated with a first retailer; or an indication of a second set of discounts associated with a second retailer.

20. A non-transitory computer readable medium embodying computer-executable instructions that, when executed by a processor, cause the processor to execute operations comprising:

determining a current location based upon received location data;

determining a travel route from the current location to a specified destination location;

receiving a query, from a user interface, requesting a plurality of requested destination types along the travel route, wherein:

each of the plurality of requested destination types belongs to at least one of a plurality of destination categories; and each of the destination categories comprises two or more of the plurality of requested destination types;

determining a result set comprising a plurality of locations corresponding to the plurality of requested destination types along the travel route;

determining at least one of discount information or membership benefits information associated with at least one location of the plurality of locations in the result set;

displaying, via the user interface and in response to the received query, a plurality of result subsets and at least one of the discount information or the membership benefits information, wherein:

each result subset of the plurality of result subsets comprises a subset of the plurality of requested destination types in the result set based upon a threshold distance, the threshold distance associated with each result subset is a distance between:

each of the requested destination types within the respective result subset; or a common location and each of the requested destination types within the respective result subset, and at least one result subset of the plurality of result subsets comprises another destination type within a same destination category as a requested destination type from the plurality of requested destination types based at least in part on the requested destination type not being within the threshold distance associated with the at least one result subset, the other destination type being within the threshold distance associated with the at least one result subset; and updating the current location, the result set, the plurality of result subsets, and at least one of the discount information or the membership benefits information based upon receiving updated location data.

\* \* \* \* \*